(12) United States Patent
Yang et al.

(10) Patent No.: US 9,674,823 B2
(45) Date of Patent: *Jun. 6, 2017

(54) METHOD AND APPARATUS FOR TRANSMITTING CONTROL INFORMATION

(71) Applicant: LG Electronics Inc., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

This patent is subject to a terminal disclaimer.

(21) Appl. No.: 14/550,641

(22) Filed: Nov. 21, 2014

(65) Prior Publication Data

US 2015/0078225 A1    Mar. 19, 2015

Related U.S. Application Data

(63) Continuation of application No. 13/806,623, filed as application No. PCT/KR2011/006909 on Sep. 19, 2011, now Pat. No. 8,995,313.

(Continued)

(51) Int. Cl.
*H04J 3/00* (2006.01)
*H04W 72/04* (2009.01)

(Continued)

(52) U.S. Cl.
CPC ....... *H04W 72/0413* (2013.01); *H04L 1/1854* (2013.01); *H04L 1/1893* (2013.01);

(Continued)

(58) Field of Classification Search
USPC .......... 370/252–280, 311–329; 455/450–562
See application file for complete search history.

(56) References Cited

U.S. PATENT DOCUMENTS 7,912,007 B2 * 3/2011 Fan ...................... H04L 1/1854
370/329

8,423,858 B2 * 4/2013 Ahn ...................... H04L 1/1812
714/748

(Continued)

FOREIGN PATENT DOCUMENTS

CN         101389123 A      3/2009

OTHER PUBLICATIONS

LG Electronics, "UL ACK/NACK Bundling," 3GPP TSG RAN WG1 #62, R1-104642, Agenda Item 6.2.2.1, Aug. 23-27, 2010, Madrid, Spain, 5 pages.

(Continued)

*Primary Examiner* — Man Phan
(74) *Attorney, Agent, or Firm* — Birch, Stewart, Kolasch & Birch, LLP

(57) ABSTRACT

A method is described for transmitting uplink control information at a communication apparatus configured with a plurality of cells including a Primary Cell (PCell) and a Secondary Cell (SCell) in a wireless communication system operating in a Time Division Duplex (TDD) mode. One or more downlink signals requiring Hybrid Automatic Repeat reQuest Acknowledgement (HARQ-ACK) feedback are received in a set of subframes. Reception response information about the one or more downlink signals is transmitted through a Physical Uplink Control CHannel (PUCCH) on a subframe configured for Scheduling Request (SR) transmission. When a predetermined condition is not satisfied, the reception response information and SR information are multiplexed and transmitted using a first HARQ-ACK PUCCH resource. When the predetermined condition is satisfied, for a positive SR, the reception response information includes information about an ACK count for the one or more downlink signals and is transmitted using a SR PUCCH resource.

10 Claims, 20 Drawing Sheets

Related U.S. Application Data

(60) Provisional application No. 61/384,300, filed on Sep. 19, 2010, provisional application No. 61/389,693, filed on Oct. 4, 2010, provisional application No. 61/409,956, filed on Nov. 3, 2010, provisional application No. 61/417,282, filed on Nov. 26, 2010, provisional application No. 61/436,596, filed on Jan. 26, 2011.

(51) Int. Cl.
*H04L 1/18* (2006.01)
*H04L 5/00* (2006.01)
*H04W 52/02* (2009.01)
*H04L 5/14* (2006.01)
*H04W 28/04* (2009.01)

(52) U.S. Cl.
CPC ............ *H04L 5/001* (2013.01); *H04L 5/0032* (2013.01); *H04L 5/0055* (2013.01); *H04L 5/14* (2013.01); *H04W 52/0209* (2013.01); *H04L 5/0082* (2013.01); *H04L 5/0094* (2013.01); *H04W 28/04* (2013.01)

(56) References Cited

U.S. PATENT DOCUMENTS

| | | | | |
|---|---|---|---|---|
| 8,472,471 | B2* | 6/2013 | Yang | H04L 1/1671 370/464 |
| 8,565,066 | B2* | 10/2013 | Nam | H04L 1/1854 370/215 |
| 8,989,169 | B2 | 3/2015 | Kwon et al. | |
| 2010/0195629 | A1 | 8/2010 | Chen et al. | |
| 2010/0232311 | A1* | 9/2010 | Zhang | H04L 5/0007 370/252 |
| 2010/0232382 | A1 | 9/2010 | Gauvreau et al. | |
| 2010/0271970 | A1* | 10/2010 | Pan | H04L 1/0026 370/252 |
| 2011/0051680 | A1 | 3/2011 | Kwak et al. | |
| 2011/0128922 | A1* | 6/2011 | Chen | H04L 5/0007 370/329 |
| 2011/0205981 | A1 | 8/2011 | Koo et al. | |
| 2011/0243066 | A1* | 10/2011 | Nayeb Nazar | H04L 1/007 370/328 |
| 2012/0113948 | A1* | 5/2012 | Kwon | H04L 1/0029 370/329 |
| 2012/0120908 | A1 | 5/2012 | Ahn et al. | |
| 2012/0307773 | A1 | 12/2012 | Tiirola et al. | |
| 2013/0010743 | A1 | 1/2013 | Ahn et al. | |
| 2013/0182619 | A1 | 7/2013 | Tiirola et al. | |

OTHER PUBLICATIONS

LG Electronics, "Multiplexing combination on PUCCH for CA," 3GPP TSG RAN WG1 #62, R1-104759, Agenda Item 6.2.2.1, Aug. 23-27, 2010, Madrid, Spain, 15 pages.

Samsung, "Discussion on concurrent transmission of SRI and CA ACK/NACK information for LTE-Advanced," 3GPP TSG RAN WG1 #62, R1-104583, Agenda Item 6.2.2.4, Aug. 23-27, 2010, Madrid, Spain, 6 pages.

Texas Instruments, "Resource Allocation for A/N Transmission on PUCCH," 3GPP TSG RAN WG1 #62, R1-104466, Agenda Item # 6.2.2.3, Aug. 23-27, 2010, Madrid, Spain, 4 pages.

* cited by examiner

Reuse of LTE PUCCH format 2 (normal CP case)

METHOD AND APPARATUS FOR TRANSMITTING CONTROL INFORMATION

CROSS-REFERENCE TO RELATED APPLICATIONS

This application is continuation of co-pending U.S. application Ser. No. 13/806,623 filed on Dec. 21, 2012 (now U.S. Pat. No. 8,995,313 issued on Mar. 31, 2015), which is the National Phase of PCT/KR2011/006909 filed on Sep. 19, 2011, which claims priority under 35 U.S.C. 119(e) to U.S. Provisional Application No. 61/384,300 filed on Sep. 19, 2010; U.S. Provisional Application No. 61/389,693 filed on Oct. 4, 2010; U.S. Provisional Application No. 61/409,956 filed on Nov. 3, 2010; U.S. Provisional Application No. 61/417,282 filed on Nov. 26, 2010 and U.S. Provisional Application No. 61/436,596 filed on Jan. 26, 2011. The contents of all of these applications are hereby incorporated by reference as fully set forth herein in their entirety.

BACKGROUND OF THE INVENTION

Field of the Invention

The present invention relates to a wireless communication system and, most particularly, to a method and apparatus for transmitting control information.

Discussion of the Related Art

Wireless communication systems are being broadly developed in order to provide various types of communication services, such as voice or data services. Generally, a wireless communication system corresponds to a multiple access system that may support communication with multiple users by sharing an available system source (bandwidth, transmission power, and so on). Examples of a multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, and so on.

SUMMARY OF THE INVENTION

An object of the present invention is to provide a method and apparatus for efficiently transmitting control information in a wireless communication system. Another object of the present invention is to provide a method and apparatus for efficiently transmitting uplink control information in a multi-cell situation and efficiently managing resources for the uplink control information transmission. It is to be understood that objects to be achieved by the present invention are not limited to the aforementioned objects and other objects which are not mentioned will be apparent to those of ordinary skill in the art to which the present invention pertains from the following description.

According to an aspect of the present invention, the object of the present invention can be achieved by providing transmitting uplink control information at a communication apparatus configured with a plurality of cells including a Primary Cell (PCell) and a Secondary Cell (SCell) in a wireless communication system, the method comprising: receiving at least one of one or more Physical Downlink Control CHannels (PDCCHs) and one or more Physical Downlink Shared CHannels (PDSCHs); generating reception response information about the at least one of the one or more PDCCHs and the one or more PDSCHs; and transmitting the reception response information through a Physical Uplink Control CHannel (PUCCH) on a Scheduling Request (SR) subframe, wherein the reception response information and SR information are multiplexed and transmitted using a PUCCH resource for Hybrid Automatic Repeat request Acknowledgement (HARQ-ACK) when a predetermined condition is not satisfied, and wherein the reception response information is transmitted using a PUCCH resource for SR when the predetermined condition is satisfied, wherein the predetermined condition includes at least one of the following conditions: (1) a single PDSCH transmission only on the PCell indicated by detection of a PDCCH having a Downlink Assignment Index (DAI) initial value is present; (2) a single PDCCH transmission only on the PCell that has the DAI initial value and indicates a Semi-Persistent Scheduling (SPS) release is present; and (3) a single PDSCH transmission only on the PCell where there is not a corresponding PDCCH.

According to another aspect of the present invention, the object of the present invention can be achieved by providing a communication apparatus configured to transmit uplink control information in a situation that a plurality of cells including a PCell and an SCell are configured in a wireless communication system, the communication apparatus comprising: a Radio Frequency (RF) unit; and a processor configured to receive at least one of one or more Physical Downlink Control CHannels (PDCCHs) and one or more Physical Downlink Shared CHannels (PDSCHs), to generate reception response information about the at least one of the one or more PDCCHs and the one or more PDSCHs, and to transmit the reception response information through a Physical Uplink Control CHannel (PUCCH) on a Scheduling Request (SR) subframe, wherein the reception response information and SR information are multiplexed and transmitted using a PUCCH resource for Hybrid Automatic Repeat request Acknowledgement (HARQ-ACK) when a predetermined condition is not satisfied, and wherein the reception response information is transmitted using a PUCCH resource for SR when the predetermined condition is satisfied, wherein the predetermined condition includes at least one of the following conditions: (1) a single PDSCH transmission designated by detection of a PDCCH having a Downlink Assignment Index (DAI) initial value is present on the PCell only; (2) a single PDCCH transmission that has the DAI initial value and indicates a Semi-Persistent Scheduling (SPS) release is present on the PCell only; and (3) a single PDSCH transmission without a corresponding PDCCH is present on the PCell only.

The DAI initial value may be 1.

When the predetermined condition is satisfied, information about an ACK count for the at least one of the one or more PDCCHs and the one or more PDSCHs may be transmitted using the PUCCH resource for SR.

The ACK count may be set to 0 when the reception response information about the at least one of the one or more PDCCHs and the one or more PDSCHs includes Negative Acknowledgement (NACK) or Discontinuous Transmission (DTX).

1-bit information indicating a positive/negative SR may be added to the reception response information when the predetermined condition is not satisfied.

The PUCCH for HARQ-ACK may be indicated by Transmit Power Control (TPC) field values of one or more SCell PDCCHs and/or one or more PCell PDCCHs that do not correspond to the DAI initial value when the predetermined condition is not satisfied.

The communication apparatus may be configured with a Time Division Duplex (TDD) mode.

In accordance with the present invention, control information can be efficiently transmitted in a wireless communication system. Specifically, uplink control information can be efficiently transmitted in an environment having a plurality of cells, and resources for the uplink control information transmission can be efficiently managed The effects that may be gained from the embodiment of the present invention will not be limited only to the effects described above. Accordingly, other effects of the present application, which are not mentioned herein, will become apparent to those having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the technical principle of the invention.

DETAILED DESCRIPTION OF THE INVENTION

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system.

For the clarity in the description of the present invention, the present invention will be described based upon the 3GPP LTE/LTE-A systems. Nevertheless, the scope and spirit of the present invention will not be limited only to those of the 3GPP LTE system and the 3GPP LTE-A system. Additionally, the specific terms used in the following description of the present invention are provided to facilitate the understanding of the present invention. And, therefore, without deviating from the technical scope and spirit of the present invention, such specific terms may also be varied and/or replaced by other terms.

In a wireless communication system, a user equipment may receive information from a base station via downlink (DL), and the user equipment may also transmit information via uplink (UL). The information received and/or transmitted (or transceived) by the user equipment includes data and diverse control information. And, various physical channels may exist depending upon the type and purpose of the information received and/or transmitted (or transceived) by the user equipment.

Figure 1:
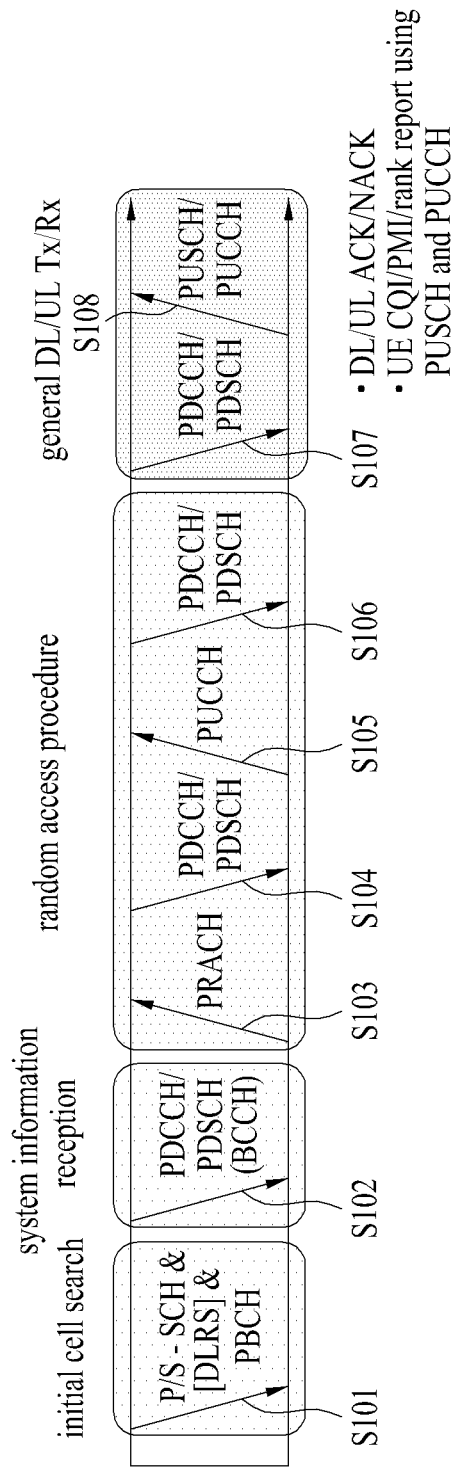
FIG. 1 illustrates physical channels that are used in a 3GPP LTE system, which corresponds to an exemplary wireless communication system, and a general signal transmitting method using the physical channels.

FIG. 1 illustrates physical channels that are used in a 3GPP LTE and a general signal transmitting method using the same.

When a power of a user equipment is turned off and then turned back on, or when a user equipment newly enters (or accesses) a cell, the user equipment performs an initial cell search process, such as synchronizing itself with the base station in step S101. For this, the user equipment may receive a Primary Synchronization Channel (P-SCH) and a Secondary Synchronization Channel (S-SCH) from the base station so as to be in synchronization with the base station, and the user equipment may also acquire information, such as cell ID. Thereafter, the user equipment may receive a Physical Broadcast Channel so as to acquire broadcast information within the cell. Meanwhile, the user equipment may receive Downlink Reference Signal (DL RS), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S102, so as to acquire more detailed system information.

Thereafter, in order to complete the access to the base station, the user equipment may perform a Random Access Procedure, such as in steps S103 and S106 of a later process, so as to complete the access to the base station. In order to do so, the user equipment transmits a preamble through a PRACH (Physical Random Access Channel) (S103), and then the user equipment may receive a response message respective to the random access through the PDCCH and its respective PDSCH (S104). In case of a contention based random access, the user equipment may perform Contention Resolution Procedures, such as transmitting an additional Physical Random Access Channel (PRACH) (S105) and receiving a Physical Downlink Control Channel (PDCCH) and a Physical Downlink Shared Channel (PDSCH) corresponding to the PDCCH.

After performing the above-described procedures, the user equipment may receive a Physical Downlink Control Channel (PDCCH)/Physical Downlink Shared Channel (PDSCH) (S107), as a general uplink/downlink signal transmission procedure, and may then perform PUSCH (Physical Uplink Shared Channel)/PUCCH (Physical Uplink Control Channel) transmission (S108). The control information being transmitted by the user equipment to the base station is collectively referred to as Uplink Control Information (UCI). The UCI may include HARQ ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2A:
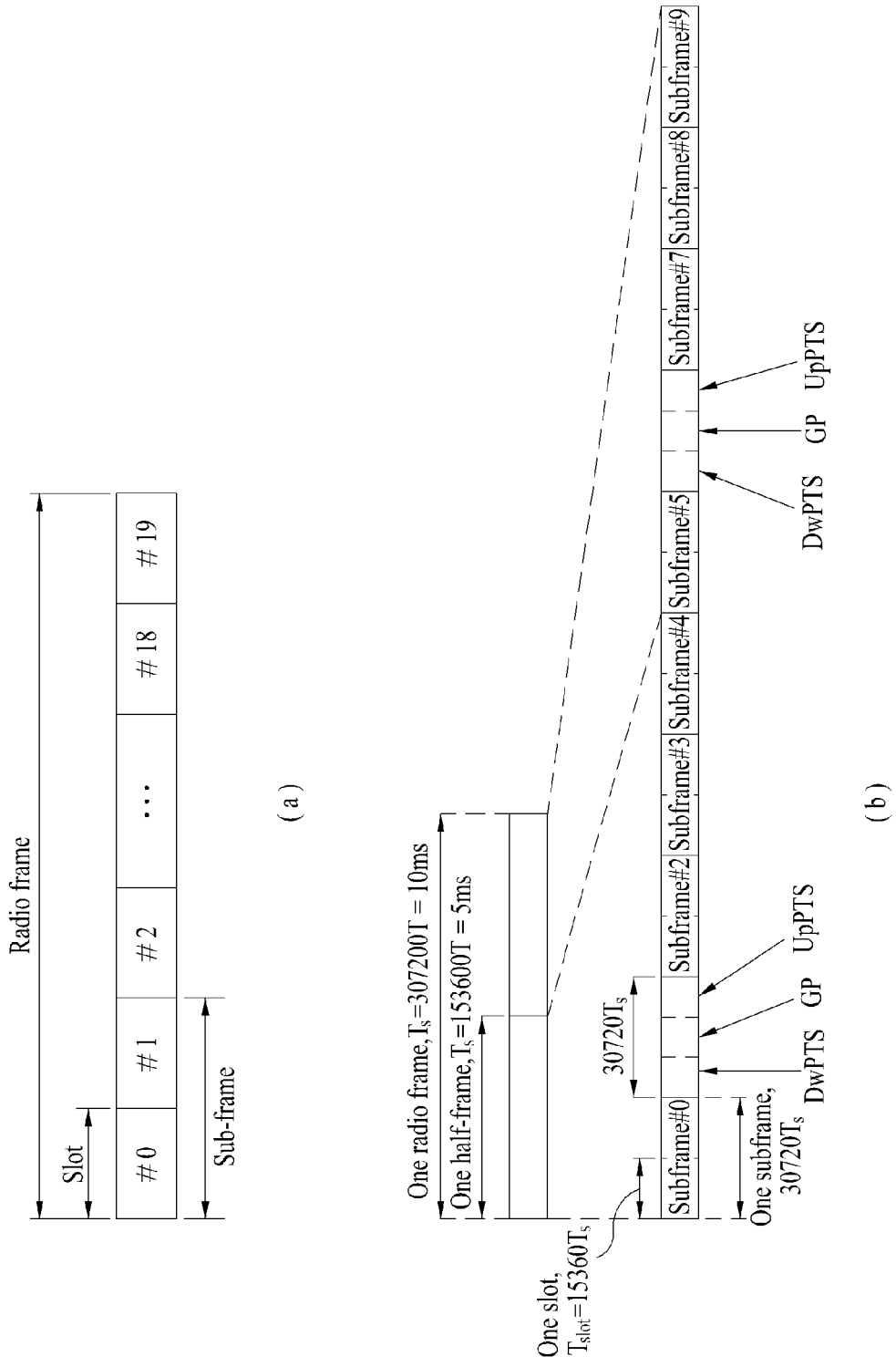
FIG. 2A illustrates an exemplary structure of a radio frame.

FIG. 2A illustrates an exemplary structure of a radio frame. In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 2A(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM symbols in the time domain and includes a plurality of Resource Blocks (RBs) in the frequency domain. Since the 3GPP LTE system uses the OFDMA in a downlink, an OFDM symbol indicates one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 PFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

FIG. 2A(b) illustrates an exemplary structure of a type 2 radio frame. The type 2 radio frame consists of 2 half frames, and each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation, which are performed by a user equipment. The UpPTS is used for channel estimation, which is performed by a base station, and for uplink transmission synchronization, which is performed by the user equipment. The guard period corresponds to a period (or section) for eliminating interference occurring in an uplink due to a multiple path delay of a downlink signal between an uplink and a downlink.

The structure of the radio frame is merely exemplary. And, therefore, the number of subframes included in the radio frame or the number of slots included in a subframe, and the number of symbols included in one slot may be diversely varied.

Figure 2B:
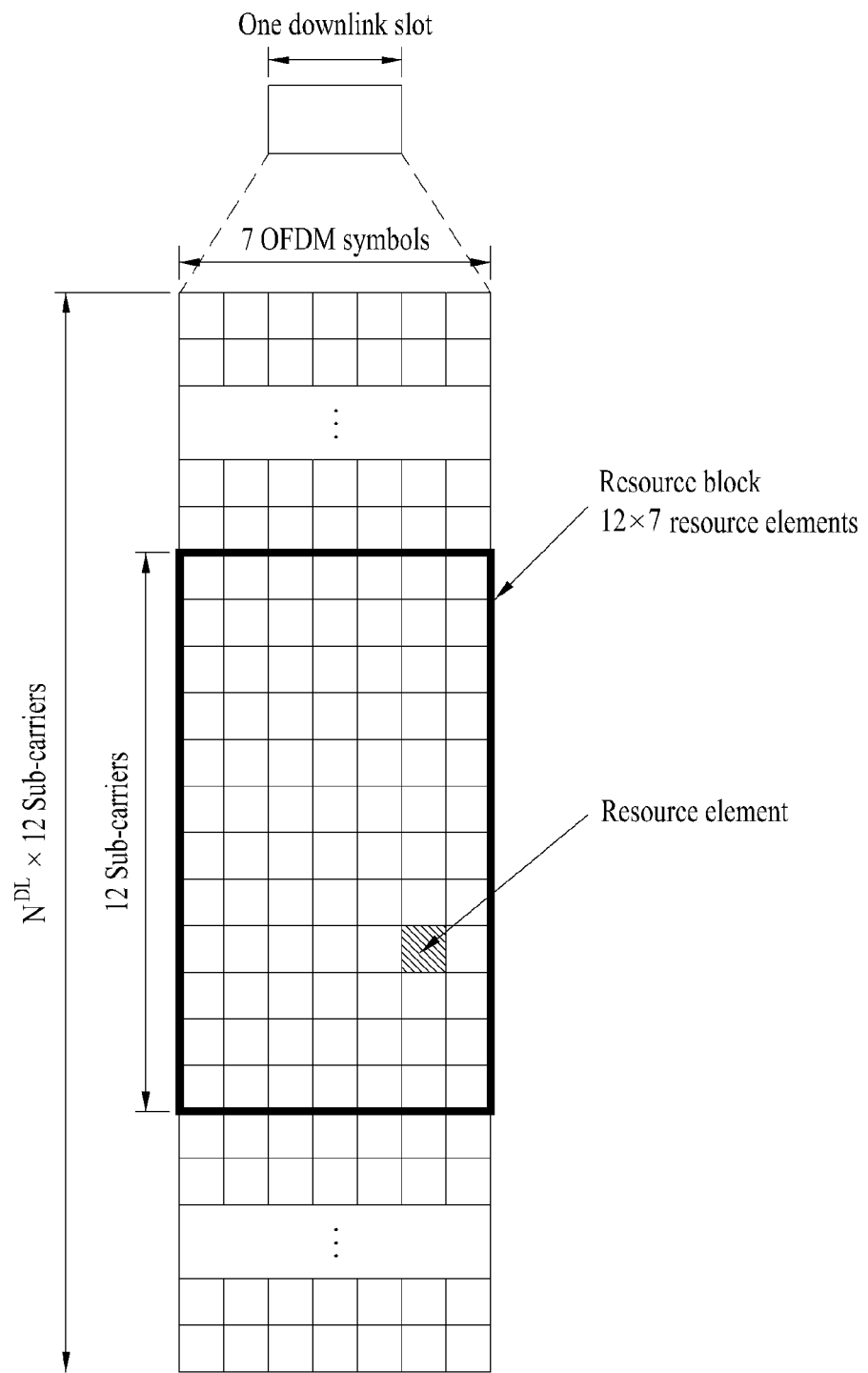
FIG. 2B illustrates an exemplary resource grid of a downlink slot.

FIG. 2B illustrates an exemplary resource grid of a downlink slot.

Referring to FIG. 2B, a downlink slot includes multiple OFDM symbols in the time domain. One downlink slot may include 7(6) OFDM symbols in a time domain, and a resource block (RB) may include 12 sub-carriers in the frequency domain. Each element within the resource grid is referred to as a Resource Element (RE). One RB includes 12×7(6) REs. $N_{RB}$, which corresponds to the number of RBs, An $N^{DL}$ number of resource blocks included in a downlink slot is dependent to a downlink transmission bandwidth. The structure of an uplink slot may be identical to the above-described structure of the downlink slot. However, the OFDM symbol may be replaced with the SC-FDMA symbol.

Figure 3:
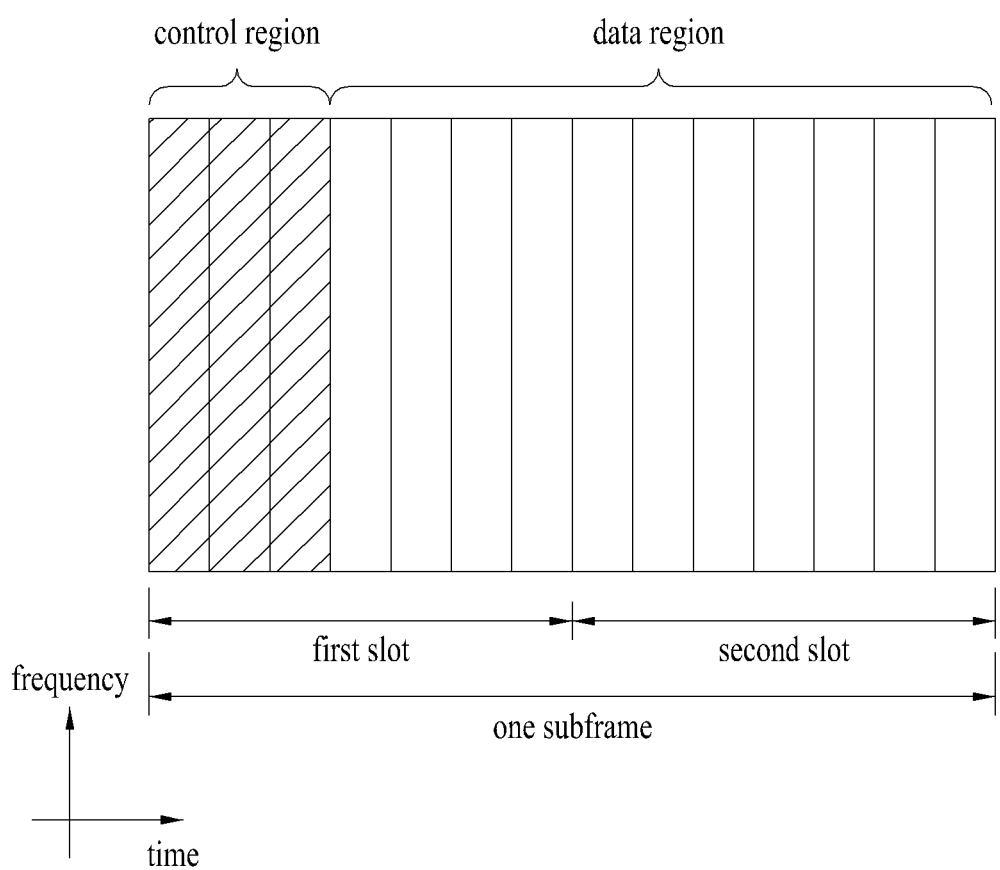
FIG. 3 illustrates a structure of a downlink frame.

FIG. 3 illustrates an exemplary structure of a downlink frame. A maximum of 3(4) OFDM symbols located at the front portion of a first slot within one subframe corresponds to a control region, wherein a control channel is allocated (or assigned). The remaining OFDM symbols correspond to a data region, wherein a Physical Downlink Shared Channel (PDSCH) is assigned. Examples of the downlink control channels that are being used in the LTE system may include a Physical Control Format Indicator Channel (PCFICH), a Physical Downlink Control Channel (PDCCH), a Physical Hybrid automatic repeat request Indicator Channel (PHICH), and so on. The PCFICH carries information on the number of OFDM symbols being transmitted from the first OFDM symbol of a subframe and being used in the control channel transmission within the subframe. As a response to an uplink transmission, the PHICH may carry HARQ ACK/NACK (Hybrid Automatic Repeat request acknowledgment/negative-acknowledgment) signals.

The control information being transmitted through the PDCCH may be referred to as DCI (Downlink Control Information). Herein, the DCI may include resource allocation information for a user equipment or user equipment group and other control information. For example, the DCI may include uplink/downlink scheduling information, an uplink transmission (Tx) power control command, and so on.

The PDCCH may carry a transmission format and resource allocation information of a downlink shared channel (DL-SCH), a transmission format and resource allocation information of an uplink shared channel (UL-SCH), paging information of a paging channel (PCH), system information of the DL-SCH, resource allocation information of a higher-layer control message, such as a Random Access Response being transmitted over the PDSCH, a set of Tx power control commands on individual user equipments within the user equipment group, a Tx power control command, indication information on the activation of a VoIP (Voice over IP), and so on. A plurality of PDCCHs may be transmitted within the control region. And, the user equipment may monitor the plurality of PDCCHs. Herein, the PDCCH may be transmitted in the form of an aggregation of one or more consecutive Control Channel Elements (CCEs). A CCE corresponds to a logical allocation unit, which is used for providing a coding rate to a PDCCH based on a radio (or wireless) channel state. Herein, the CCR corresponds to multiple resource element groups (REGs). Herein, the number of PDCCH formats and the number of available data bits may be decided in accordance with the number of CCEs. The base station may decide a PDCCH format in accordance with the DCI, which is to be transmitted to the user equipment, and may add a CRC (Cyclic Redundancy Check) to the control information. Depending upon the owner of the PDCCH or the usage purpose of the PDCCH, the CRC may be masked with an identifier (e.g., an RNTI (Radio Network Temporary Identifier). For example, if the PDCCH is designated to a particular (or specific) user equipment, an identifier (e.g., cell-RNTI (C-RNTI)) of the corresponding user equipment may be masked to the CRC. Alternatively, if the PDCCH is designated to a paging message, a paging identifier (e.g., paging-RNTI (P-RNTI)) may be masked to the CRC. If the PDCCH is designated to system information (most particularly, to a system information block (SIC)), an S-RNTI (system information RNTI) may be masked to the CRC. If the PDCCH is designated to a random access response, an RA-RNTI (random access-RNTI) may be masked to the CRC.

Figure 4:
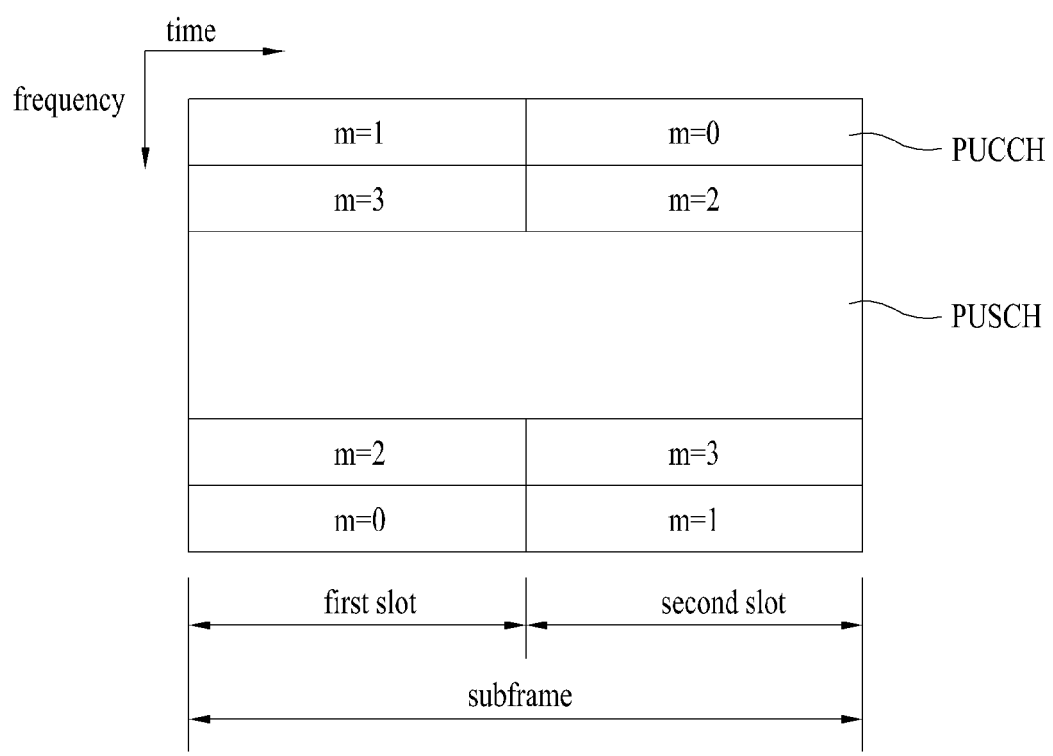
FIG. 4 illustrates a structure of an uplink subframe.

FIG. 4 illustrates an exemplary structure of an uplink subframe being used in the LTE. Referring to FIG. 4, an uplink subframe includes multiple (e.g., 2) slots. A slot may include different numbers of SC-FDMA symbols based upon a CP length. In the frequency domain, an uplink subframe may be divided into a control region and a data region. The data region includes a PUSCH and is used for transmitting data signals, such as sound. The control region includes a PUCCH and is used for transmitting Uplink Control Information (UCI). The PUCCH includes an RB pair, which is located at each end portion of the data region along the frequency axis, and may be "frequency-hopped" at the slot boundary.

The PUCCH may be used for transmitting the following control information.

SR (Scheduling Request): corresponds to information that is used for requesting uplink UL-SCH resource. The SR is transmitted by using an OOK (On-Off Keying) method.

HARQ-ACK/NACK: corresponds to a response signal for a downlink data packet within the PDSCH. The HARQ-ACK/NACK indicates whether or not the downlink data packet has been successfully received. A 1-bit ACK/NACK is transmitted as a response for a single downlink codeword, and a 2-bit ACK/NACK is transmitted as a response for two downlink codewords.

CQI (Channel Quality Indicator): corresponds to feedback information respective to a downlink channel. Feedback information related to the MIMO (Multiple Input Multiple Output) includes an RI (Rank Indicator), PMI (Precoding Matrix Indicator), PTI (Precoding Type Indicator), and so on. 20 bits are used for each subframe.

The amount (or size) of the control information (UCI) that can be transmitted by the user equipment from a subframe depends upon a number of SC-FDMAs that are available for control information transmission. The SC-FDMAs that are available for control information transmission refers to SC-FDMA symbols that remain after excluding the SC-FDMA symbol for reference signal transmission from the subframe. And, in case of a subframe having an SRS (Sounding Reference Signal) determined therein, the last SC-FDMA symbol of the subframe may also be excluded. Herein, a reference signal is used for a coherent detection of the PUCCH. And, the PUCCH supports 7 different formats in accordance with the transmitted information.

Table 1 below shows a mapping relation between the PUCCH format and the UCI in the LTE system.

TABLE 1

| PUCCH format | Uplink Control Information (UCI) |
| --- | --- |
| Format 1 | SR (Scheduling Request) (non-modulated wave) |
| Format 1a | 1-bit HARQ ACK/NACK (SR present/absent) |
| Format 1b | 2-bit HARQ ACK/NACK (SR present/absent) |
| Format 2 | CQI (20 coded bits) |
| Format 2 | CQI and 1- or 2-bit HARQ ACK/NACK (20 bits) (corresponds only to extension CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
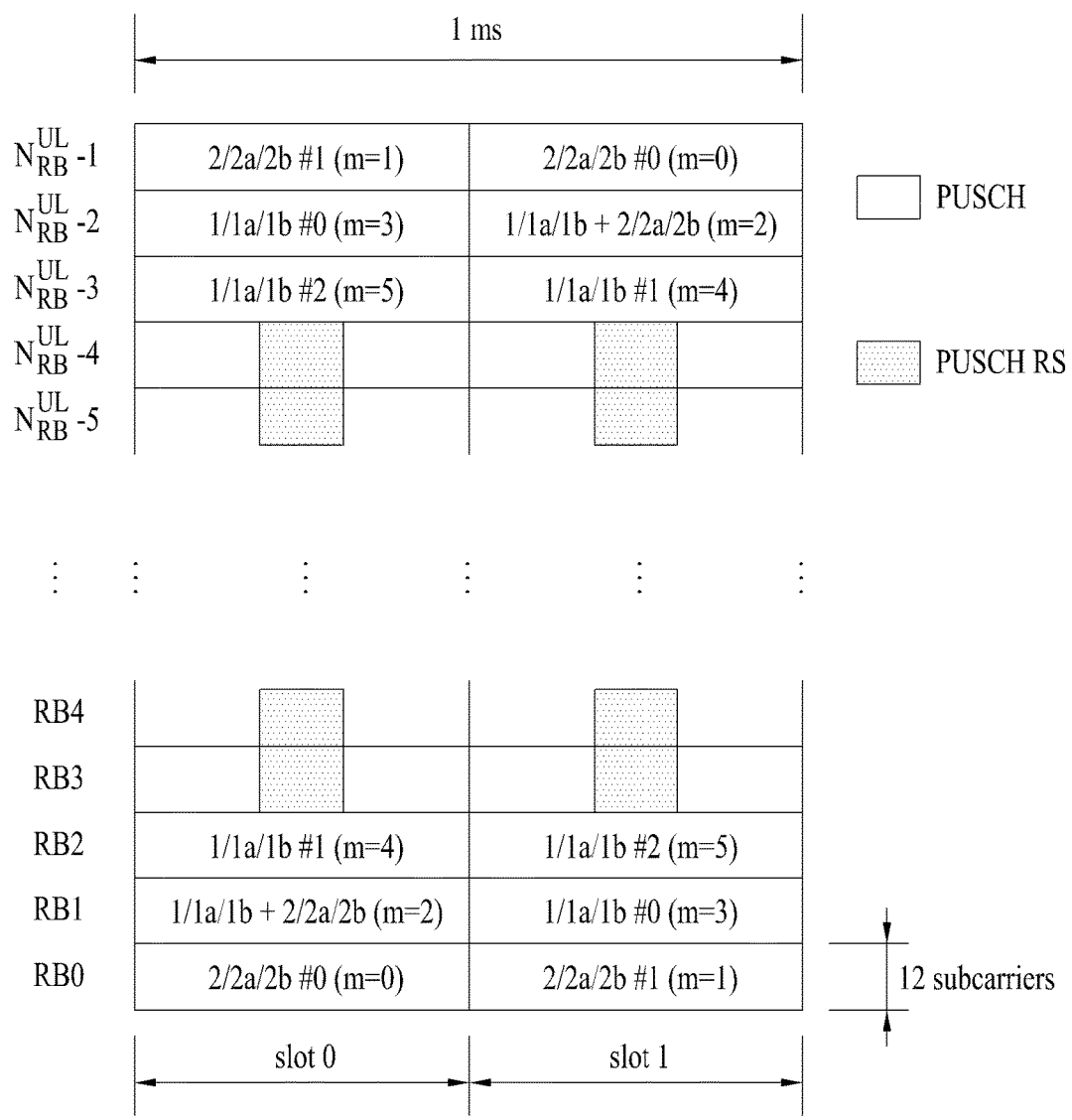
FIG. 5 illustrates an exemplary procedure of physically mapping a PUCCH format to a PUCCH domain.

FIG. 5 illustrates an exemplary procedure of physically mapping a PUCCH format to a PUCCH domain.

Referring to FIG. 5, the PUCCH formats are mapped on the RBs starting from the band-edge and inwards by the order of PUCCH formats 2/2a/2b (CQI) (e.g., PUCCH region m=0, 1), PUCCH formats 2/2a/2b (CQI) or PUCCH formats 1/1a/1b (SR/HARQ ACK/NACK) (e.g., if present, PUCCH region m=2), and PUCCH formats 1/1a/1b (SR/HARQ ACK/NACK) (e.g., PUCCH region m=3, 4, 5), thereby being transmitted. $N_{RB}^{(2)}$, the number of PUCCH RBs that can be used in the PUCCH format 2/2a/2b (CQI), is transmitted to the user equipment within the cell through broadcast signaling.

Figure 6:
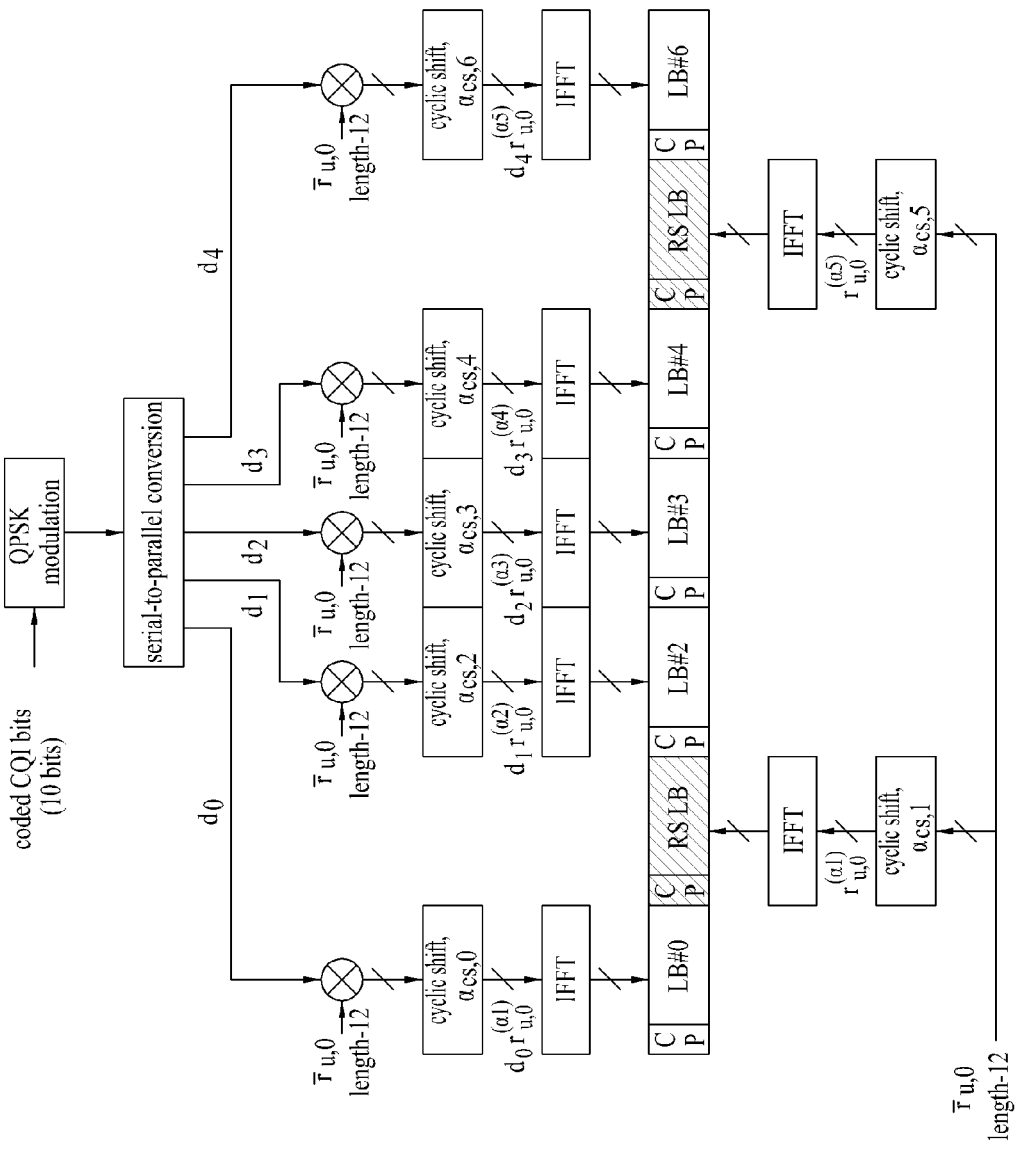
FIG. 6 illustrates a slot level structure of PUCCH formats 2/2a/2b.

FIG. 6 illustrates a slot level structure of PUCCH formats 2/2a/2b. PUCCH formats 2/2a/2b are used for CSI transmission. The CSI includes CQI, PMI, RI, and so on. In case of a normal CP (Cyclic Prefix), SC-FDMA #1 and #5 within the slot are used for DM RS (Demodulation Reference Signal) transmission. In case of an extended CP, only SC-FDMA #3 within the slot is used for the DM RS transmission.

Referring to FIG. 6, in a subframe level, 10-bit CSI information uses a (20,k) Reed-Muller code, which is punctured at a rate of ½, so as to be channel-coded to 20 coded bits (not shown). Thereafter, the coded bits may be processed with scrambling (not shown), so as to be mapped to a QPSK (Quadrature Phase Shift Keying) constellation (QPSK modulation). The scrambling process may be performed by using a length-31 gold sequence, which is similar to PUSCH data. Accordingly, 10 QPSK modulation symbols are generated, and 5 QPSK modulation symbols ($d_0$~$d_4$) are transmitted from each slot through the corresponding SC-FDMA symbol. Each QPSK modulation symbol are used for modulating a length-12 base RS sequence ($r_{u,0}$) prior to the IFFT (Inverse Fast Fourier Transform). Eventually, the RS sequence is processed with a Cyclic Shift (CS) in the time domain in accordance with the QPSK modulation symbol value ($d_x * r_{u,o}^{(\alpha x)}$, x=0~4). The RS sequence, which is multiplied by the QPSK modulation symbol is then cyclic shifted ($\alpha_{cs,x}$, x=1, 5). In case the number of cyclic shifts is equal to N, N number of user equipments may be multiplexed over the same CSI PUCCH RB. Although the DM RS sequence is similar to the CSI sequence in the frequency domain, the CSI sequence is not modulated by the CSI modulation symbol.

A parameter or resource for periodic reporting of the CSI is semi-statically configured by higher layer (e.g., RRC (Radio Resource Control)) signaling. For example, when PUCCH resource index $n_{PUCCH}^{(2)}$ is set up for CSI transmission, the CSI is periodically transmitted over a CSI PUCCH, which is linked to the PUCCH resource index $n_{PUCCH}^{(2)}$. The PUCCH resource index $n_{PUCCH}^{(2)}$ indicates a PUCCH RB and a cyclic shift ($\alpha_{cs}$).

Figure 7:
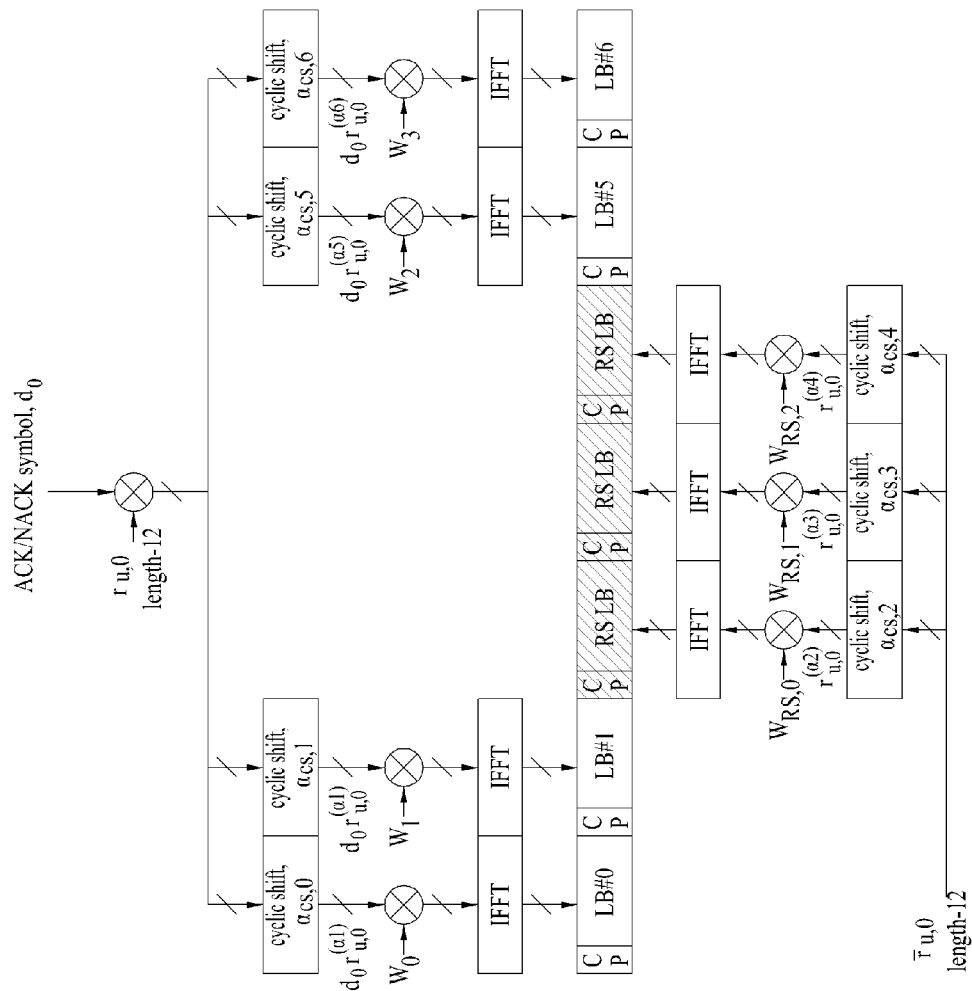
FIG. 7 illustrates a slot level structure of PUCCH formats 1a/1b.

FIG. 7 illustrates a slot level structure of PUCCH formats 1a/1b. PUCCH formats 1a/1b are used for ACK/NACK transmission. In case of a normal CP, SC-FDMA #2/#3/#4 within the slot are used for DM RS (Demodulation Reference Signal) transmission. In case of an extended CP, SC-FDMA #2/#3 within the slot are used for the DM RS transmission. Therefore, 4 SC-FDMA symbols are being used for ACK/NACK transmission.

Referring to FIG. 7, 1-bit and 2-bit ACK/NACK information are respectively modulated by using a BPSK modulation scheme and a QPSK modulation scheme, thereby generating a single ACK/NACK modulation symbol ($d_0$). In case of a positive ACK, the ACK/NACK information is given as 1, and, in case of a negative ACK, the ACK/NACK information is given as 0. Table 2 shown below represents a modulation table, which is defined for PUCCH formats 1a and 1b in the conventional LTE system.

TABLE 2

| PUCCH Format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In addition to performing cyclic shift ($\alpha_{cs,x}$) in the frequency domain, just as the above-described CSI, the PUCCH formats 1a/1b may also use an orthogonal dispersion (or spreading) code (e.g., Walsh-Hadamard or DFT code) ($w_0,w_1,w_2,w_3$), so as to perform time domain dispersion (or spreading). In case of the PUCCH formats 1a/1b, since code multiplexing is used in both frequency domain and time domain, a larger number of user equipments may be multiplexed over the same PUCCH RB.

The RSs that are each transmitted from different user equipments are multiplexed by using the same method as the UCI. A number of cyclic shifts that are supported in an SC-FDMA symbol for the PUCCH ACK/NACK RB may be cell-specifically configured by a higher layer signaling parameter $\Delta_{shift}^{PUCCH}$. $\Delta_{shift}^{PUCCH} \in \{1, 2, 3\}$ indicates that the shift values are respectively equal to 12, 6, and 4. A number of dispersion codes that can actually be used for the ACK/NACK in the time-domain CDM may be limited by the number of RS symbols. Due to a small number of RS symbols, the multiplexing capacity of the RS symbol is smaller than the multiplexing capacity of the UCI symbol.

Figure 8:
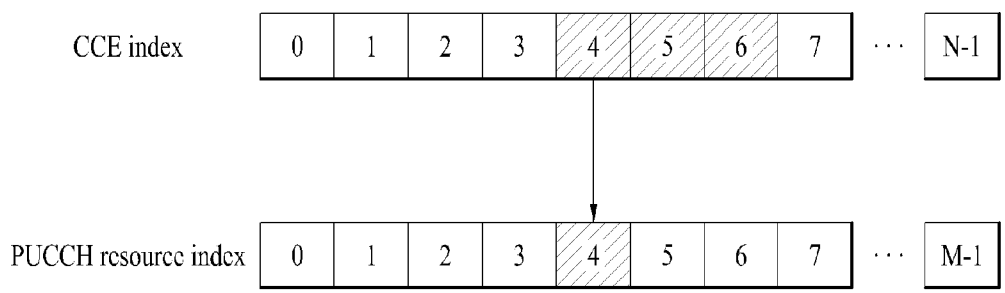
FIG. 8 illustrates an example of deciding a PUCCH resource for ACK/NACK.

FIG. 8 illustrates an example of deciding a PUCCH resource for ACK/NACK. In the LTE system, the PUCCH resource for ACK/NACK is not allocated to each user equipment in advance. Instead, multiple user equipments within a cell respectively use divided sections of multiple PUCCH resources at each time point. More specifically, the PUCCH resource that is used by the user equipment for transmitting the ACK/NACK corresponds to the PDCCH, which carries the scheduling information respective to the corresponding downlink data. In each downlink subframe, a whole region having the PDCCH transmitted thereto is configured of multiple CCEs (Control Channel Elements), and the PDCCH being transmitted to the user equipment is configured of one or more CCEs. Among the CCEs configuring the PDCCH, which is received by the user equipment, the corresponding user equipment transmits the ACK/NACK through a PUCCH resource corresponding to a specific CCE (e.g., the first CCE).

Referring to FIG. 8, in a Downlink Component Carrier (DL CC), each rectangle (or square) represents a CCE. And, in an Uplink Component Carrier (UL CC), each rectangle (or square) represents a PUCCH resource. Each PUCCH index corresponds to a PUCCH resource for the ACK/NACK. As shown in FIG. 8, when it is assumed that information on the PDSCH is being delivered through a PDCCH, which is configured of CCEs numbers 4-6, the user equipment transmits the ACK/NACK through PUCCH number 4 respective to CCE number 4, which corresponds to the first CCE configuring the PDCCH. FIG. 8 shows an example of a case when a maximum M number of PUCCHs exists in the UL CC, when a maximum N number of CCEs exists in the DL CC. Although N=M, the system may be designed so that the value of M and the value of N can be different from one another, and so that the mapping of the CCEs and PUCCHs can be overlapped.

More specifically, in the LTE system, the PUCCH resource index may be decided as shown below.

$$n^{(1)}_{PUCCH} = n_{CCE} + N^{(1)}_{PUCCH} \quad \text{[Equation 1]}$$

Herein, $n^{(1)}_{PUCCH}$ represents a resource index of PUCCH Format 1 for transmitting ACK/NACK/DTX, $N^{(1)}_{PUCCH}$ indicates a signaling value received from a higher layer, and $n_{CCE}$ represents a lowest value among the CCE indexes that are used for the PDCCH transmission. A cyclic shift, an orthogonal dispersion code, and a PRB (Physical Resource Block) for PUCCH formats 1a/1b may be obtained from the $n^{(1)}_{PUCCH}$.

In case the LTE system operates in the TDD mode, the user equipment transmits a single multiplexed ACK/NACK signal respective to the multiple PDSCHs, which are received through the subframe at different time points. More specifically, the user equipment uses an ACK/NACK channel selection method (simply referred to as a channel selection method), so as to transmit the single multiplexed ACK/NACK signal respective to the multiple PDSCHs. The ACK/NACK channel selection method may also be referred to as a PUCCH selection method. In the ACK/NACK channel selection method, in case the user equipment has received multiple sets of downlink data, the user equipment occupies multiple uplink physical channels in order to transmit the multiplexed ACK/NACK signal. For example, in case the user equipment has received multiple PDSCHs, the user equipment may use a specific CCE of the PDCCH, which indicates each PDSCH, so as to be capable of occupying the same number of PUCCHs. In this case, based upon a combination of the information on which PUCCH is to be selected, among the plurality of occupied PUCCHS, and the modulated/encoded contents that are applied to the selected PUCCH, the multiplexed ACK/NACK signal may be transmitted.

Table 3 shown below indicates the ACK/NACK channel selection method, which is defined in the LTE system.

TABLE 3

| HARQ-ACK(0), HARQ-ACK(1), HARQ-ACK(2), HARQ-ACK(3) | Subframe | |
|---|---|---|
| | $n^{(1)}_{PUCCH,X}$ | b(0), b(1) |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,2}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 3, HARQ-ACK(i) represents an HARQ ACK/NACK/DTX result of an i-$^{th}$ data unit ($0 \le i \le 3$). The DTX (Discontinuous Transmission) indicates a case when no data unit transmission corresponding to the HARQ-ACK(i) exists, or a case when the user equipment is incapable of detecting the presence (or existence) of a data unit corresponding to the HARQ-ACK(i). With respect to each data unit, a maximum of 4 PUCCH resources (i.e., $n^{(1)}_{PUCCH,0} \sim n^{(1)}_{PUCCH,3}$) may be occupied. The multiplexed ACK/NACK may be transmitted through a single PUCCH, which is selected from the occupied PUCCH resources. Herein, $n^{(1)}_{PUCCH,X}$, which is indicated in Table 3 represents a PUCCH resource that is used for actually transmitting the ACK/NACK. And, b(0)b(1) represents two bits that are being transmitted through the selected PUCCH resource and is modulated by using the QPSK method (or scheme). For example, when the user equipment has successfully decoded 4 data units, the user equipment transmits (1,1) to the base station through the PUCCH resource, which is connected to $n^{(1)}_{PUCCH,1}$. Since it is difficult to indicate all ACK/NACK assumptions, in which the PUCCH resource and the QPSK symbol can be combined, with the exception for a few cases, the NACK is coupled with the DTX (NACK/DTX, N/D).

Figure 9:
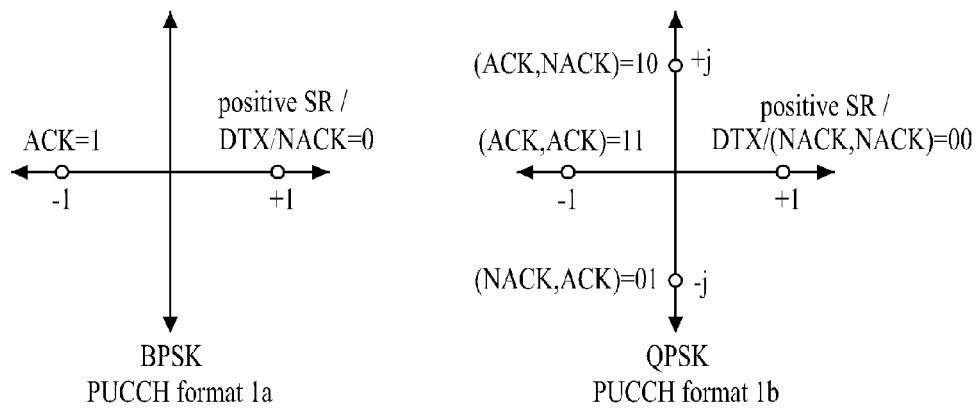
FIG. 9 illustrates an exemplary method of multiplexing an ACK/NACK with an SR.

FIG. 9 illustrates an exemplary method of multiplexing an ACK/NACK with an SR.

The structure of the SR PUCCH format 1 is identical to the ACK/NACK PUCCH format 1a/1b shown in FIG. 9. The SR uses On-Off keying. More specifically, in order to request a PUSCH resource (positive SR), the user equipment transmits an SR having a modulation symbol d(0)=1. And, when scheduling is not requested (negative SR), the user equipment does not perform any transmission (or does not transmit anything). Since the same PUCCH structure for the ACK/NACK is re-used for the SR, different PUCCH resource indexes existing in the same PUCCH region (e.g., a combination of different cyclic time shift/orthogonal code) may be allocated to the SR (format 1) or the HARQ ACK/NACK (formats 1a/1b). The PUCCH resource index $m_{PUCCH,SR1}{}^{(1)}$, which is to be used by the user equipment for SR transmission may be determined by UE-specific higher layer signaling.

When the user equipment is required to transmit a positive SR in a subframe being scheduled to perform CQI transmission, the CQI is dropped, and only the SR is transmitted. Similarly, when a simultaneous SR and SRS (Sounding RS) transmission situation occurs, the user equipment drops the CQI and transmits only the SR. In case the SR and the ACK/NACK are generated from the same subframe, the user equipment may transmit the ACK/NACK over the SR PUCCH resource, which is allocated for the positive SR. In case of the negative SR, the user equipment transmits the ACK/NACK over the allocated HARD-ACK PUCCH resource. FIG. 9 shows an exemplary mapping constellation for a simultaneous transmission of the ACK/NACK and the SR. More specifically, FIG. 9 shows an example of a case when the NACK (or NACK, NACK, in case of two MIMO codewords) is modulated and mapped to +1 (n RS modulation). Accordingly, when a DTX (Discontinuous Transmission) occurs, the signal is processed as a NACK.

Figure 10:
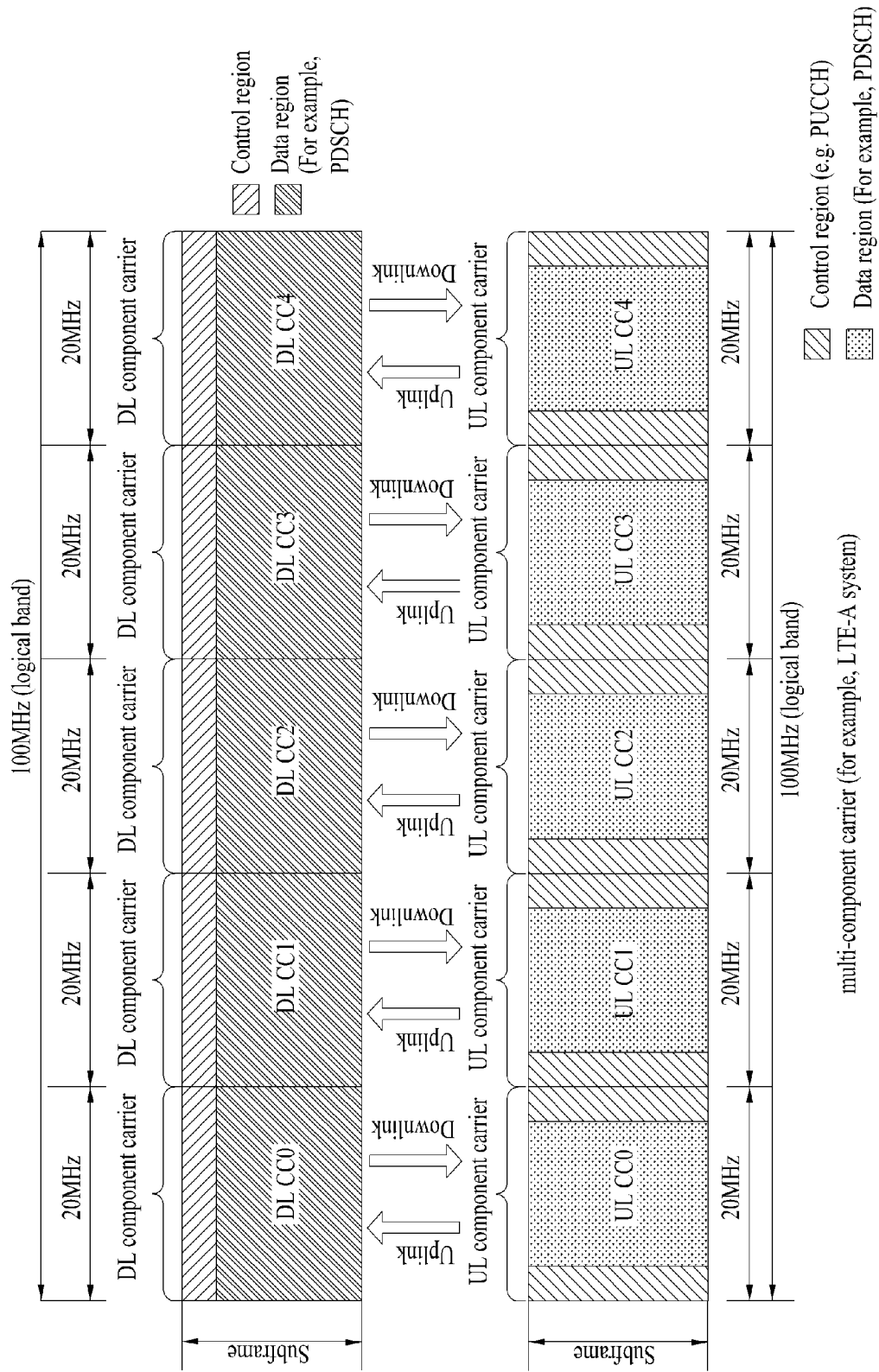
FIG. 10 illustrates an exemplary Carrier Aggregation (CA) communication system.

FIG. 10 illustrates an exemplary Carrier Aggregation (CA) communication system. An LTE-A system uses a carrier aggregation or bandwidth aggregation technique, which uses a larger uplink/downlink bandwidth by grouping (or gathering) multiple uplink/downlink frequency blocks in order to use a broader frequency bandwidth. Each frequency block is transmitted by using a Component Carrier (CC). Herein, a component carrier may be understood as a carrier frequency (or central carrier, central frequency for the respective frequency block.

Referring to FIG. 10, multiple uplink/downlink Component Carriers (CCs) may be grouped (or gathered), so as to support a broader (or wider) uplink/downlink bandwidth. Each CC may be adjacent to one another or non-adjacent to one another in the frequency domain. The bandwidth of each component carrier may be independently decided. Asymmetric carrier aggregation, wherein the number of UL CCs is different from the number of DL CCs, may also be used. For example, when the number of DL CCs is equal to 2, and when the number of UL CCs is equal to 1, configurations having a 2:1 correspondence may be formed. Additionally, even if the overall system band is configured of N number of CCs, the frequency band that may be monitored/received by a specific user equipment may be limited to M(<N) number of CCs. Various parameters respective to carrier aggregation may be determined by using cell-specific, UE group-specific, or UE-specific methods. Meanwhile, control information may be determined to be transmitted and/or received (or transceived) only through a specific CC. Such specific CC may be referred to as a Primary CC (PCC) (or anchor CC), and the remaining CCs may be referred to as Secondary CCs (SCCs).

The LTE-A system uses the concept of a cell in order to manage radio resources. A cell is defined as a combination of a downlink resource and an uplink resource, and the uplink resource does not correspond to an essential element. Therefore, the cell may be configured only of a downlink resource, or the cell may be configured of both the downlink resource and the uplink resource. In case carrier aggregation is supported, a linkage between the carrier frequency of a downlink resource (or DL CC) and the carrier frequency of an uplink resource (or UL CC) may be indicated by the system information. A cell that is operated over the primary frequency (or PCC) may be referred to as a Primary Cell (PCell), and a cell that is operated over the secondary frequency (or SCC) may be referred to as a Secondary Cell (SCell). The PCell is used, when the user equipment performs an initial connection establishment process or a connection re-establishment process. The PCell may also indicate a cell that is indicated during a handover procedure. The SCell may be configured after the RRC connection is established, and the SCell may be used for providing additional radio resource. The PCell and the SCell may be collectively referred to as a serving cell. Accordingly, in case of a user equipment that is in an RRC_CONNECTED state, yet not set up with carrier aggregation, or does not support carrier aggregation, only a single serving cell configured only of the PCell may exist. Conversely, in case of a user equipment that is in an RRC_CONNECTED state and set up with carrier aggregation, one or more serving cells may exist, and a PCell and all of the SCells may be included in all of the serving cells. In order to perform carrier aggregation, after an initial security activation process is initiated, the network may configure one or more SCells, so that the one or more SCells can added to the PCell, which is initially configured, for a user equipment supporting carrier aggregation.

When cross-carrier scheduling (or cross-CC scheduling) is applied, the PDCCH for downlink allocation may be transmitted to DL CC #0, and the corresponding PDSCH may be transmitted to DL CC #2. In order to perform cross-CC scheduling, the adoption of a carrier indicator field (CIF) may be considered. The presence or absence of the CIF within the PDCCH may be configured through higher layer signaling (e.g., RRC signaling) by using a half-static and UE-specific (or UE group-specific) method. A base line of the PDCCH transmission may be summarized as shown below.

CIF disabled: the PDCCH within the DL CC allocates PDSCH resource within the same DL CC or allocates a PUSCH resource within a linked UL CC.

CIF enabled: the PDCCH within the DL CC is capable of allocating a PDSCH or PUSCH within a specific DL/UL CC, among the plurality of aggregated DL/UL CCs by using the CIF.

When the CIF exists, the base station may allocate a PDCCH monitoring DL CC set in order to reduce BD complexity of the user equipment. As a portion of the overall aggregated DL CC, the PDCCH monitoring DL CC set includes one or more DL CCs, and the user equipment may perform detection/decoding of the PDCCH only within the corresponding DL CC. More specifically, when the base station schedules the PDSCH/PUSCH to the user equipment, the PDCCH is transmitted only through the PDCCH monitoring DL CC set. The PDCCH monitoring DL CC set may be determined by using the UE-specific method, the UE-group-specific method, or the cell-specific method. The term "PDCCH monitoring DL CC" may be replaced with other equivalent terms such as monitoring carrier, monitoring cell, and so on. Furthermore, the aggregated CC designated to the user equipment may also be replaced with other equivalent terms such as a serving CC, a serving carrier, a serving cell, and so on.

Figure 11:
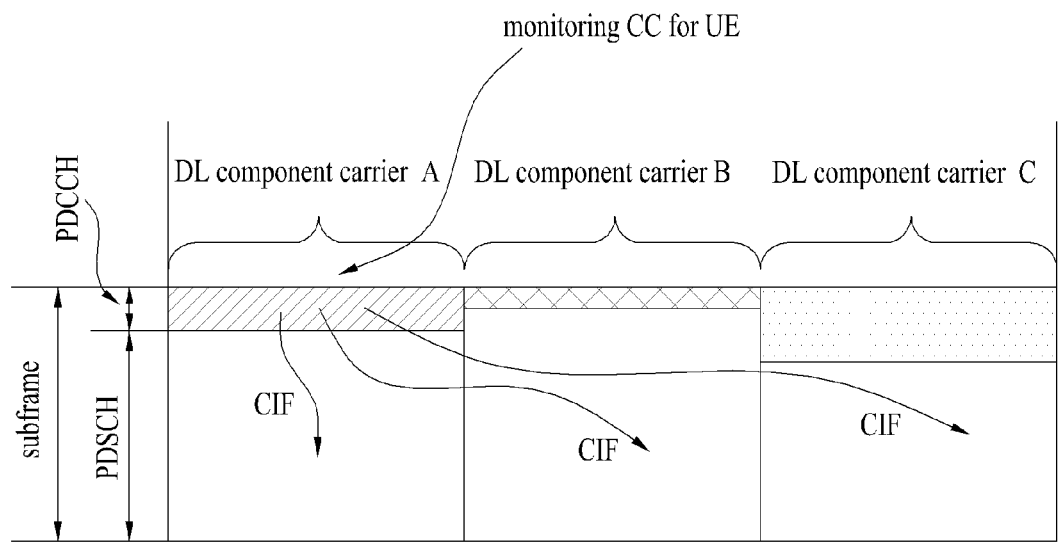
FIG. 11 illustrates an exemplary cross-carrier scheduling.

FIG. 11 illustrates an exemplary cross-carrier scheduling. Herein, it will be assumed that 3 DL CCs are aggregated. And, it will also be assumed that DL CC A is determined as the PDCCH monitoring DL CC. DL CC A~C may also be referred to as service CCs, service carriers, serving cells, and so on. When the CIF is disabled, each DL CC may transmit only the PDCCH scheduling its own PDSCH without the CIF, in accordance with the LTE PDCCH rule. Conversely, when the CIF is enabled by UE-specific (or UE-group specific or cell-specific) higher layer signaling, DL CC A (monitoring DL CC) may use the CIF, so as to transmit the PDCCH scheduling the PDSCH of DL CC A and also to transmit the PDCCH scheduling the PDSCH of other CCs. In this case, the PDCCH is not transmitted from DL CC B/C, which are not determined as the PDCCH monitoring DL CC.

In the LTE-A system, it may be considered that diverse ACK/NACK information/signals respective to the multiple PDSCHs, which are transmitted through multiple DL CCs, may be transmitted through a specific UL CC. In order to do so, it may be considered that, unlike the ACK/NACK transmission using the PUCCH formats 1a/1b of the conventional LTE system, the diverse ACK/NACK information are first processed with joint coding (e.g., Reed-Muller code, Tail-biting convolutional code, and so on), and that diverse ACK/NACK information/signals are transmitted by using PUCCH format 2 or by using a new PUCCH format (referred to as an E-PUCCH (Enhanced PUCCH) format or PUCCH format X). The E-PUCCH format includes a Block-spreading based PUCCH format, as shown below. After performing joint coding, as an example, an ACK/NACK transmission using the PUCCH format 2/E-PUCCH format, the PUCCH format 2/E-PUCCH format may be used for UCI transmission without any limitations. For example, the PUCCH format 2/E-PUCCH format may be used for transmitting an ACK/NACK, CSI (e.g., CQI, PMI, RI, PTI, and so on), SR, or for collectively transmitting 2 or more types of information. In the description of the present invention, the PUCCH format 2/E-PUCCH format may be used for transmitting a joint-coded UCI codeword regardless of the type/number/size of the UCI.

Figure 12:
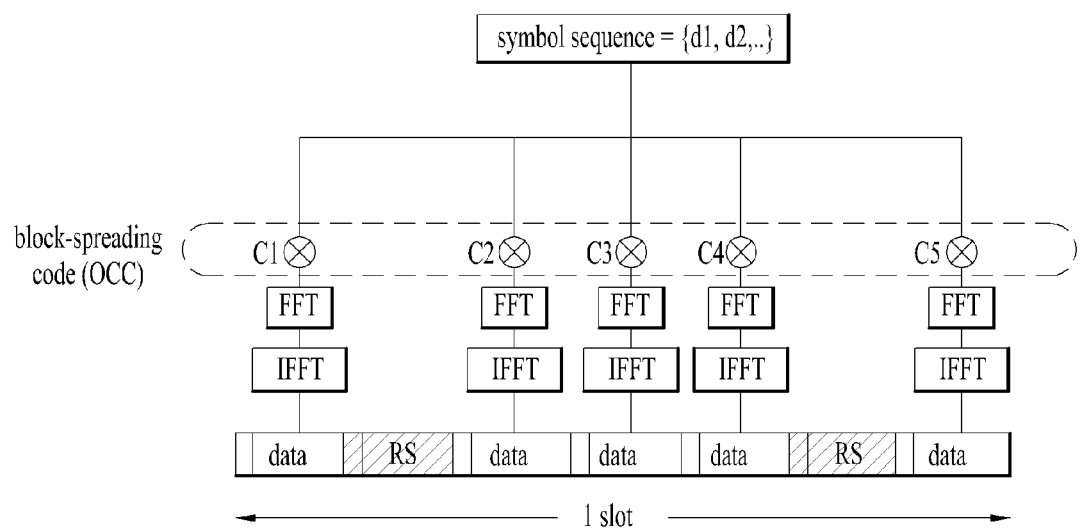
FIGS. 12~13 illustrate an exemplary E-PUCCH format based on block-spreading (or block-dispersion).

FIG. 12 illustrates an exemplary E-PUCCH format based on block-spreading (or block-dispersion) in a slot level. In the PUCCH format 2 of the conventional LTE system, one symbol sequence (FIG. 6, d0~d4) is transmitted over the time domain, and user equipment multiplexing is performed by using a CS ($\alpha_{cs,x}$, x=0~4) of a CAZAC (Constant-Amplitude Zero Auto-Correlation) sequence ($r_{u,o}$), as shown in FIG. 6. Conversely, in case of the block-spreading based E-PUCCH format, one symbol sequence is transmitted over the frequency domain, and user equipment multiplexing is performed by using an OCC (Orthogonal Cover Code) based time-domain dispersion (or spreading). More specifically, the symbol sequence is time-domain dispersed (or spread) by the OCC, thereby being transmitted. By using the OCC, the same RB may multiplex the control signals of multiple user equipments.

Referring to FIG. 12, by using a length-5 (SF (Spreading Factor)=5) OCC (C1~C5), 5 SC-FDMA symbols (i.e., UCI data part) are generated from one symbol sequence ({d1, d2, ...}). Herein, the symbol sequence ({d1, d2, ...}) may signify a modulation symbol sequence or a codeword bit sequence. In case the symbol sequence ({d1, d2, ...}) represents the codeword bit sequence, the block diagram of FIG. 13 further includes modulation block. Although it is shown in the drawing that a total of 2 RS symbols (i.e., RS part) are used during 1 slot, diverse applied variations, such as a method of using an RS part, which is configured of 3 RS symbols, and using a UCI data part, which is configured by using an OCC of SF=4, may be considered. Herein, the RS symbols may be generated from a CAZAC sequence having a specific cyclic shift. Additionally, the RS may be transmitted in a format having multiple RS symbols of the time domain be applied with (be multiplied by) a specific OCC. The block-spread UCI is transmitted to the network after being processed with an FFT (Fast Fourier Transform) procedure and an IFFT (Inverse Fast Fourier Transform) procedure in SC-FDMA symbol units. More specifically, unlike the PUCCH format 1 or 2 groups of the conventional LTE system, the block-spreading method modulates the control information (e.g., ACK/NACK, and so on) by using the SC-FDMA method.

Figure 13:
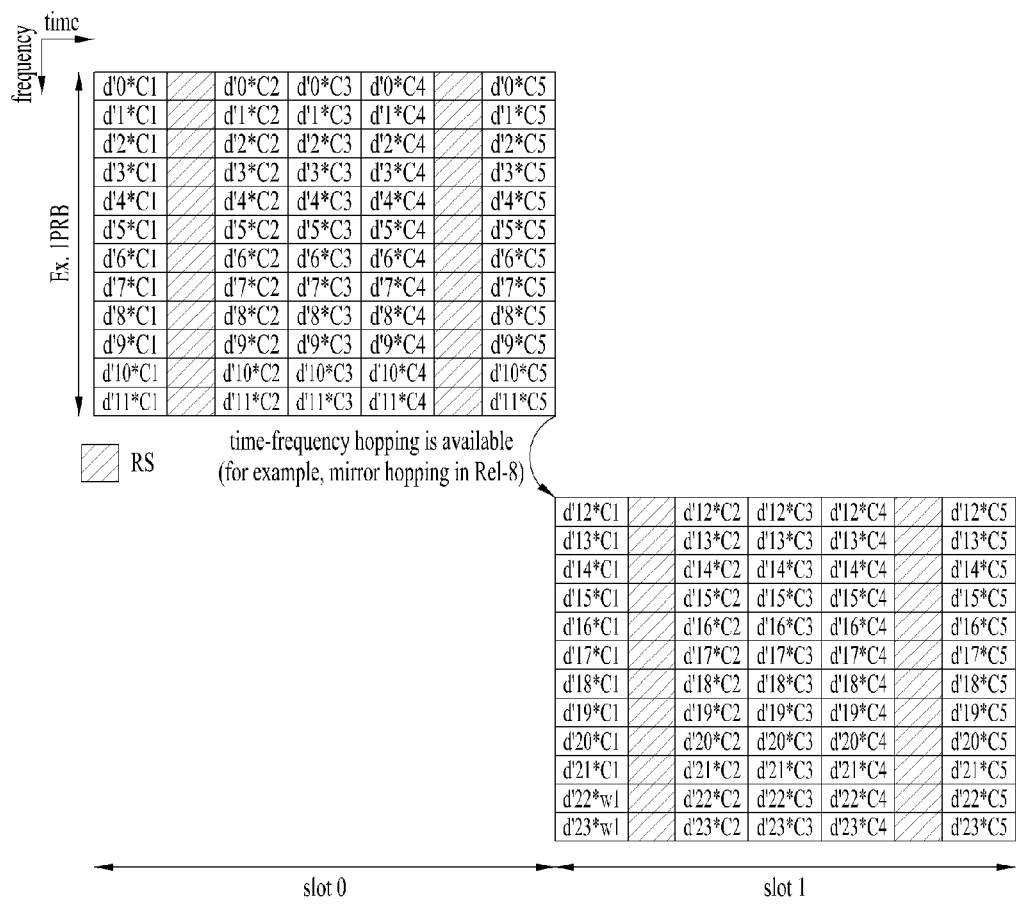

FIG. 13 illustrates an exemplary E-PUCCH format based on block-spreading (or block-dispersion) in a subframe level.

Referring to FIG. 13, in slot 0, a symbol sequence ({d'0~d'11}) is mapped to a subcarrier of an SC-FDMA symbol, and the symbol sequence is mapped to 5 SC-FDMA symbols by a block-spreading method using an OCC (C1~C5). Similarly, in slot 1, a symbol sequence ({d'12~d'23}) is mapped to a subcarrier of an SC-FDMA symbol, and the symbol sequence is mapped to 5 SC-FDMA symbols by a block-spreading method using an OCC (C1~C5). Herein, the symbol sequence ({d'0~d'11} or {d'12~d'23}), which is shown in each slot, represents a sequence format having FFT or FFT/IFFT applied to the symbol sequence ({d1, d2, ...}) of FIG. 13. In case the symbol sequence ({d'0~d'11} or {d'12~d'23}) corresponds to a format having FFT applied to the symbol sequence ({d1, d2, ...}) of FIG. 13, IFFT may be additionally applied to {d'0~d'11} or {d'12~d'23} for SC-FDMA generation. The overall symbol sequence ({d'0~d'23}) is generated by performing joint-coding on one or more UCIs, and the first half ({d'0~d'11}) is transmitted through slot 0, and the second half ({d'0~d'11}) is transmitted through slot 1. Although it is not shown in the drawing, the OCC may be modified to slot units, and the UCI data may be scrambled in SC-FDMA symbol units.

Hereinafter, for simplicity in the description of the present invention, a UCI (e.g., multiple ACK/NACKs) transmission method based on channel coding using the PUCCH format 2 or E-PUCCH format will be referred to as a "multi-bit UCI coding" transmission method. For example, in case of the ACK/NACK, the multi-bit UCI coding transmission method corresponds to a method that performs joint coding on ACK/NACK or DTX information (signifying that the PDCCH cannot be received/detected) respective to the PDCCH, which indicates PDSCH and/or SPS (Semi-Persistent Scheduling) release of multiple DL cells, and that transmits the generated and coded ACK/NACK block. For example, it will be assumed that the user equipment is operated in the SU-MIMO mode in a particular DL cell and receives 2 codewords. In this case, a total of 4 feedback states, such as ACK/ACK, ACK/NACK, NACK/ACK, and NACK/NACK, may exist, or a maximum of 5 feedback states including DTX may exist. If the user equipment receives a single codeword, a maximum of 3 feedback states, such as ACK, NACK, and DTX, may exist (if the NACK is processed identically as the DTX, a total of 2 feedback states ACK and NACK/DTX may exist). Accordingly, if the user equipment integrates a maximum of 5 DL cells, and if the user equipment is operated in the SU-MIMO (Single User Multiple Input Multiple Output) mode in each cell, a maximum of $5^5$ transmittable feedback states may exist. Therefore, the required ACK/NACK payload size is equal to at least 12 bits. If the DTX is processed identically as the NACK, the number of feedback states becomes equal to $4^5$, and the required ACK/NACK payload size is equal to at least 10 bits.

Meanwhile, an implicit ACK/NACK channel selection method, which uses a PUCCH resource corresponding to the PDCCH scheduling each PDSCH of the respective user equipment in order to ensure PUCCH resource (i.e., (a PUCCH resource) being linked with the smallest (or lowest) CCE index) is essentially used in the ACK/NACK multiplexing method (i.e., ACK/NACK channel selection method) (see Table 3), which is applied in the conventional LTE TDD system. However, when applying the implicit method by using the PUCCH resource within different RBs, degradation in the system performance may occur. Therefore, the LTE-A system may additionally consider an "explicit ACK/NACK channel selection" method, which uses a PUCCH resource being reserved in advance for each user equipment (preferably multiple PUCCH resource existing in the same RB or neighboring (or adjacent) RBs) through RRC signaling, and so on. Furthermore, the LTE-A system also considers ACK/NACK transmission through one UE-specific UL cell (e.g., PCell).

Table 4 below shows an example of explicitly indicating a PUCCH resource for HARD ACK.

TABLE 4

| HARQ-ACK resource value for PUCCH (ARI) | $n_{PUCCH}$ |
|---|---|
| 00 | $1^{st}$ PUCCH resource value configured by a higher layer |
| 01 | $2^{nd}$ PUCCH resource value configured by a higher layer |
| 10 | $3^{rd}$ PUCCH resource value configured by a higher layer |
| 11 | $4^{th}$ PUCCH resource value configured by a higher layer |

ARI: ACK/NACK Resource Indicator. In Table 4, the higher layer includes an RRC layer, and the ARI value may be indicated through the PDCCH, which carries a DL grant. For example, the ARI value may be indicated by using an SCell PDCCH and/or a TPC (Transmit Power Control) field of one or more PCell PDCCHs that do not correspond to the DAI initial value.

Figure 14:
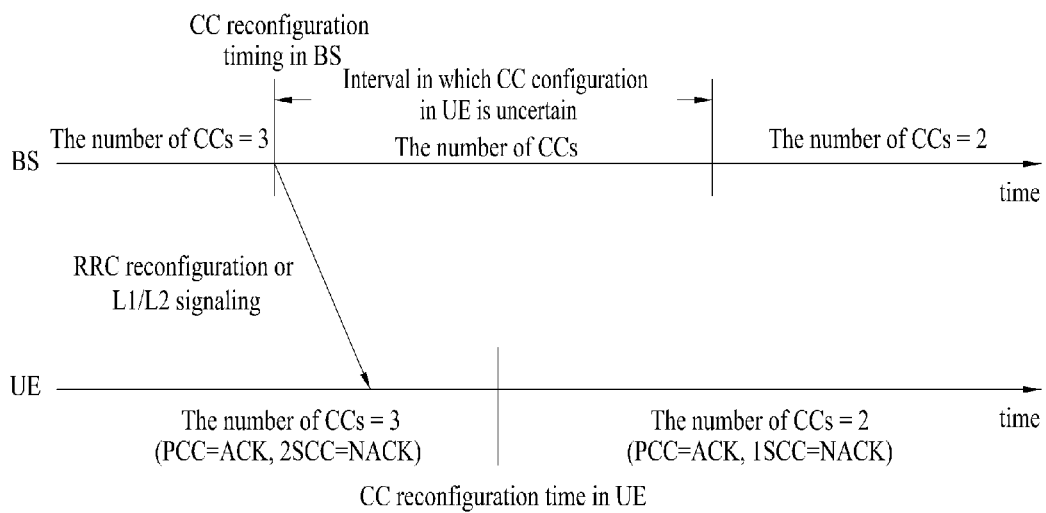
FIG. 14 illustrates exemplary operations of a base station and a user equipment in a DL CC modification section.

FIG. 14 illustrates exemplary operations of a base station and a user equipment in a DL CC modification section. In the LTE-A system, a DL CC set that is aggregated by the user equipment may be UE-specifically allocated and reconfigured through RRC signaling.

Referring to FIG. 14, when the base station changes (or modifies) the DL CC(s) that can be used by the user equipment by performing RRC reconfiguration or L1/L2 control signaling, the timing between the base station and the user equipment, at which the changed (or modified) DL CC(s) can be applied, may be different from one another. For example, when the base station changes the number of CCs that can be used by the user equipment from 3 to 2, the time point at which the base station changes the number of DL CCs from 3 to 2 and transmits the downlink data, and the time point at which the user equipment changes the number of serving DL CCs from 3 to 2 may be different from one another. Additionally, even though the base station directs (or indicates) a change in the number of CCs, if the user equipment fails to receive the above-mentioned direction (or indication), a time interval may occur, wherein the number of DL CCs known by the user equipment is different from the number of DL CCs known by the base station.

Accordingly, the base station may expect to receive ACK/NACK respective to 2 DL CCs, while the user equipment transmits ACK/NACK respective to 3 DL CCs. Alternatively, the base station may expect to receive ACK/NACK respective to 3 DL CCs, while the user equipment transmits ACK/NACK respective to 2 DL CCs. In this case, a problem may occur in that the ACK/NACK cannot be accurately demodulated. For example, in case of the multi-bit UCI coding method, the size/configuration of the ACK/NACK payload known and recognized by the base station and the user equipment may be different from one another. Furthermore, in case of the ACK/NACK channel selection method, the mapping/configuration of the ACK/NACK state recognized by the base station and the user equipment may be different from one another.

In order to resolve the above-described problems, when one or more CCs, including at least the DL PCC (also referred to as a DL PCell), are scheduled, when the states of the remaining CCs (i.e., DL SCCs (also referred to as DL SCells)), excluding the DL PCC, all correspond to NACK or DTX, it may be considered to transmit the ACK/NACK by using an implicit PUCCH resource (e.g., see Equation 1), which is linked to the PDCCH scheduling the DL PCC. In other words, when the ACK/NACK state for the DL PCC (or each CW of the DL PCC) corresponds to "A" or "N", and when the ACK/NACK state for each of the DL SCCs (or each CW of the DL SCCs) corresponds to "N/D", limitations may be made so that an implicit PUCCH resource being linked to the PDCCH for the DL PCC, in accordance with the method defined in the conventional LTE system, can be used instead of the explicit PUCCH resource (also referred to as "PCC fallback" or "PCell fallback" for simplicity). Most particularly, when performing PCC fallback, a PUCCH format that is for the transmission of the ACK/NACK state and a modulation symbol that is transmitted through the PUCCH format may be limited to follow the method defined in the conventional LTE system. For example, when performing PCC fallback, the ACK/NACK state may be transmitted by using the PUCCH format 1a/1b shown in FIG. 7 and the modulation table (see Table 2).

More specifically, a case when the transmission mode of the PCC is set to a non-MIMO mode (single CW) will first be described. Herein, 2 ACK/NACK states will be assumed, wherein the ACK/NACK state for the PCC is "A" or "N", and wherein the ACK/NACK state for all SCCs (or each CW of the SCCs) is "N/D". In this case, the ACK/NACK states may be mapped to 2 constellation points on the implicit PUCCH resource, which is linked to the PDCCH scheduling the PCC. Herein, the 2 constellation points for the ACK/NACK states may preferably be limited to 2 constellation points, which are defined for the transmission of PUCCH format 1a ACK/NACK respective to a single CW transmission in a single CC. Alternatively, the 2 constellation points for the ACK/NACK states may be limited to 2 constellation points for "AA" and "NN", among the 4 constellation points, which are defined for the transmission of PUCCH format 1b ACK/NACK in a single CC. More specifically, the mapping positions of the ACK/NACK states on the constellation may be decided with reference to "A", "N" of the PCC. Preferably, the mapping positions of the ACK/NACK states on the constellation may be limited so that "A", "N" of the PCC are placed at the same positions as the "A", "N" of PUCCH format 1a, or at the same positions as the "AA", "NN" of PUCCH format 1b.

Hereinafter, a case when the PCC is configured as the MIMO mode (e.g., two CWs or 2 TBs) will be described. Herein, 4 ACK/NACK states will be assumed, wherein the ACK/NACK state for the PCC is "A+A" or "A+N" or "N+A" or "N+N", and wherein the ACK/NACK state for all SCCs (or each CW of the SCCs) is "N/D". In this case, the ACK/NACK states may be mapped to 4 constellation points on the implicit PUCCH resource, which is linked to the PDCCH scheduling the PCC. Herein, the 4 constellation points for the ACK/NACK states may preferably be limited to 4 constellation points, which are defined for the transmission of PUCCH format 1b ACK/NACK respective to the transmission of two CWs in a single CC. The positions at which the ACK/NACK states are mapped on the constellation may be decided with reference to "A", "N" of the each CW of the PCC. In the description of the present invention, "N" of the PCC includes NACK, DTX, or NACK/DTX. Preferably, on the constellation, the "A", "N" of each CW included in the PCC are mapped to the same positions as the "A", "N" of each CW for of PUCCH format 1b.

Figure 15:
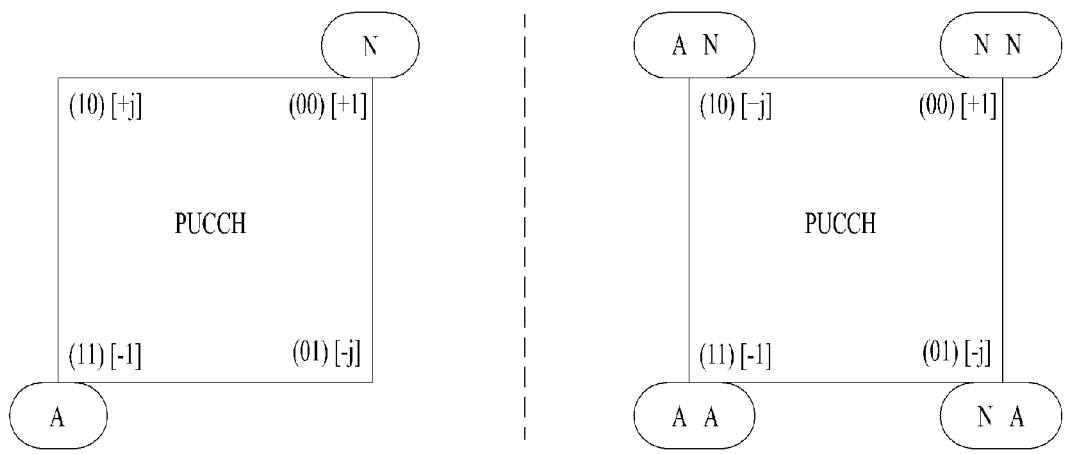
FIG. 15 illustrates an exemplary ACK/NACK channel selection method according to the conventional LTE.
Figure 16:
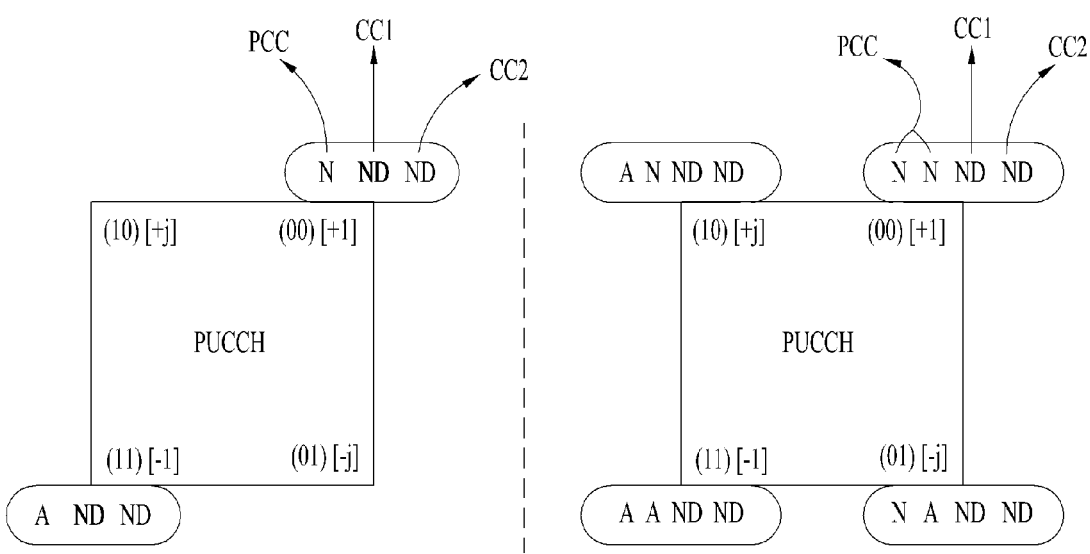
FIG. 16 illustrates an exemplary ACK/NACK transmitting method according to a PCC fallback method.

FIG. 15 illustrates an exemplary PUCCH formats 1a/1b based ACK/NACK channel selection method respective to the transmission of a single/two CW(s) in a single CC according to the conventional LTE. FIG. 16 illustrates an exemplary ACK/NACK transmitting method according to a PCC fallback method, when the PCC is configured as a non-MIMO or MIMO transmission mode, in a case when 3 CCs (PCC, CC1, CC2) are aggregated. In this example, it will be assumed that the SCCs (i.e., CC1, CC2) are all configured as the non-MIMO transmission mode for simplicity.

Referring to FIG. 15~16, when the ACK/NACK state is "A" or "N" for the non-MIMO mode PCC, and when the ACK/NACK state for all of the SCCs is "N/D", an "explicit ACK/NACK channel selection" method is not applied (i.e., PCC fallback). More specifically, the ACK/NACK state (PCC, CC1, CC2)=(A, N/D, N/D), (N, N/D, N/D) is mapped/transmitted to/using an implicit PUCCH resource that is linked to the PDCCH scheduling the PCC. In this case, the mapping relation between the ACK/NACK state and the constellation mapping follows the rule of the conventional LTE system shown in FIG. 15 with reference to the ACK/NACK for the PCC.

Additionally, when the ACK/NACK state is "A+A" or "A+N" or "N+A" or "N+N" for the MIMO mode PCC, and when the ACK/NACK state for all of the SCCs is "N/D", an "explicit ACK/NACK channel selection" method is not applied (i.e., PCC fallback). In this case, the mapping relation between the ACK/NACK state and the constellation mapping follows the rule of the conventional LTE system shown in FIG. 15 with reference to the ACK/NACK for the PCC. More specifically, the ACK/NACK state (PCC CW1, PCC CW2, CC1, CC2)=(A, A, N/D, N/D), (A, N, N/D, N/D), (N, A, N/D, N/D), (N, N, N/D, N/D) is mapped/transmitted to/using an implicit PUCCH resource that is linked to the PDCCH scheduling the PCC.

Even if the PCC is configures as the MIMO mode, one CW or multiple CWs being transmitted on the PCC may be scheduled through a single PCC PDCCH. Accordingly, in order to perform transmission of the ACK/NACK related to the PCC, a single implicit PUCCH resource is occupied.

Tables 5~6 respectively show exemplary ACK/NACK state mapping tables in accordance with FIG. 16. Tables 5~6 respectively show a partial state, among the total ACK/NACK states, when PCC fallback is being performed. The mapping relation between the PUCCH resource, which is used for transmitting the remaining ACK/NACK state, and the bit value may be arbitrarily defined in the present invention. More specifically, the mapping relation between the PUCCH resource, which is used for transmitting the remaining ACK/NACK state, and the bit value is don't care (irrelevant) in the present invention.

TABLE 5

| PCC HARQ-ACK(0) | SCC1 HARQ-ACK(1) | SCC2 HARQ-ACK(2) | $b(0), \ldots, b(M_{bit} - 1)$ | d(0) |
|---|---|---|---|---|
| ACK | NACK/DTX | NACK/DTX | 1 (11) | −1 |
| NACK | NACK/DTX | NACK/DTX | 0 (00) | +1 |

Herein, HARQ-ACK(0) represents an ACK/NACK/DTX response for a CW (or TB) of the PCC. HARQ-ACK(1) represents an ACK/NACK/DTX response for SCC1. HARQ-ACK(2) represents an ACK/NACK/DTX response for CW1 of SCC2. The ACK/NACK/DTX response includes ACK, NACK, DTX or NACK/DTX. In the PCC, the NACK includes NACK, DTX or NACK/DTX. d(0) corresponding to the ACK/NACK state is transmitted by using an implicit PUCCH resource, and the implicit PUCCH resource is liked to a PDCCH that is used for scheduling the CW (or TB) of the PCC (e.g., see Equation 1). PUCCH formats 1a/1b and, more preferably, PUCCH format 1b may be used.

TABLE 6

| PCC | | SCC1 | | | |
|---|---|---|---|---|---|
| HARQ-ACK(0) | HARQ-ACK(1) | HARQ-ACK(2) | SCC2 HARQ-ACK(3) | $b(0), \ldots, b(M_{bit} - 1)$ | d(0) |
| ACK | ACK | NACK/DTX | NACK/DTX | 11 | −1 |
| ACK | NACK | NACK/DTX | NACK/DTX | 10 | j |
| NACK | ACK | NACK/DTX | NACK/DTX | 01 | −j |
| NACK | NACK | NACK/DTX | NACK/DTX | 00 | 1 |

Herein, HARQ-ACK(0) represents an ACK/NACK/DTX response for CW1 (or TB1) of the PCC, and HARQ-ACK(1) represents an ACK/NACK/DTX response for CW2 (or TB2) of the PCC. HARQ-ACK(2) represents an ACK/NACK/DTX response for SCC1. HARQ-ACK(3) represents an ACK/NACK/DTX response for CW1 of SCC2. The ACK/NACK/DTX response includes ACK, NACK, DTX or NACK/DTX. In the PCC, the NACK includes NACK, DTX or NACK/DTX. d(0) corresponding to the ACK/NACK state is transmitted by using an implicit PUCCH resource, and the implicit PUCCH resource is liked to a PDCCH that is used for scheduling the CW (or TB) of the PCC (e.g., see Equation 1). PUCCH format 1b may be used.

In FIG. 16, it is assumed that the number of SCCs is equal to 2, and that each SCC is set to a non-MIMO mode. However, the above-described assumption is merely exemplary. And, therefore, the number of SCCs and the transmission mode of each SCC may be diversely varied.

Meanwhile, when applying the multi-bit UCI coding and (explicit) ACK/NACK channel selection method, various methods may be considered for the SR transmission. Hereinafter, when multiple CCs (in other words, carriers, frequency resources, cells, and so on) are aggregated, a method for efficiently transmitting the uplink control information and, more preferably, the ACK/NACK and the SR, and a resource allocation method for the same will be described in detail.

For simplicity in the description, it will be assumed in the following description that 2 CCs are configured for one user equipment. Also, in case the CC is configured a non-MIMO mode, it will be assumed that a maximum of one transport block (or codeword) can be transmitted at a subframe k of the corresponding CC. Additionally, in case the CC is configured as a MIMO mode, it will also be assumed that a maximum of m number (e.g., 2) of transport blocks (or codewords) can be transmitted at a subframe k of the corresponding CC. Information on whether or not the CC is configured as the MIMO mode may be known by using the transmission mode, which is configured by a higher layer. Furthermore, it will also be assumed that the number of ACK/NACKs for the corresponding CC is configured as 1 ACK/NACK (non-MIMO) or m ACK/NACKs (MIMO) in accordance with the configured transmission mode of the corresponding CC, regardless of the number of actually transmitted transport blocks (or codewords).

First of all, the terms that are used in the description of the present invention will hereinafter be described.

HARQ-ACK: indicates a reception response result for a downlink transmission (e.g., PDSCH or SPS release PDCCH), i.e., an ACK/NACK/DTX response (simply referred to as an ACK/NACK response). ACK/NACK/DTX response represents ACK, NACK, DTX or NACK/DTX. Also, the terms "HARQ-ACK for (or respective to) a specific CC" or "HARQ-ACK of a specific CC" indicates an ACK/NACK response respective to a downlink signal (e.g., PDSCH) associated with the respective CC (e.g., scheduled to the respective CC). Furthermore, the ACK/NACK state represents a combination corresponding to multiple HARQ-ACKs. Herein, the PDSCH may be replaced with a transport block or a codeword.

PUCCH index: corresponds to a PUCCH resource. The PUCCH index indicates, for example, a PUCCH resource index. The PUCCH resource index is mapped to at least one of an orthogonal cover (OC), a cyclic shift (CS), and a PRB. In case the ACK/NACK channel selection method is applied, the PUCCH index includes a PUCCH (resource) index for the PUCCH format 1b.

PUCCH resource linked to a CC: represents a PUCCH resource (see Equation 1, implicit PUCCH resource) linked to the PDCCH corresponding to the PDSCH on the respective CC, or represents a PUCCH resource (explicit PUCCH resource) indicated/allocated by a PDCCH, which corresponds to a PDSCH on the respective CC. In the explicit PUCCH resource method, the PUCCH resource may be indicated/allocated by using an ARI (ACK/NACK Resource Indicator) of the PDCCH.

ARI (ACK/NACK Resource Indicator): is used for the purpose of indicating the PUCCH resource. For example, the ARI may be used for the purpose of notifying a resource modification value (e.g., offset) respective to a specific PUCCH resource (group) (which is configured by a higher layer). In another example, the ARI may be used for the purpose of notifying a specific PUCCH resource (group)

index within a specific PUCCH resource (group) set (which is configured by a higher layer). The ARI may be included in a TPC (Transmit Power Control) field of the PDCCH corresponding to the PDSCH on the SCC. The PUCCH power control may be performed through the TPC field within the PDCCH scheduling the PCC (i.e., the PDCCH corresponding to the PDSCH on the PCC). Furthermore, the ARI may be included in the TPC field of the remaining PDCCHs, after excluding the PDCCH that have a DAI (Downlink Assignment Index) initial value and schedules a specific cell (e.g., PCell). The ARI may be used interchangeably with an HARQ-ACK resource indication value.

Implicit PUCCH resource: indicates a PUCCH resource/index that is linked to a lowest CCE index of the PDCCH, which schedules the PCC (see Equation 1).

Explicit PUCCH resource: The explicit PUCCH resource may be indicated by using the ARI. When the ARI cannot be applied, the explicit PUCCH resource may correspond to a PUCCH resource, which is fixed in advance by higher layer signaling. The explicit PUCCH index(es) may be allocated to one user equipment may so that all indexes are adjacent to one another, indexes for each resource group are adjacent to one another, or all indexes are independent from one another.

CC scheduling PDCCH: represents a PDCCH that schedules the PDSCH on a corresponding CC. More specifically, the CC scheduling PDCCH indicates a PDCCH corresponding to the PDSCH on the corresponding CC.

PCC PDCCH: indicates the PDCCH that schedules the PCC. More specifically, the PCC PDCCH indicates a PDCCH corresponding to the PDSCH on the PCC. When it is assumed that cross-carrier scheduling is not allowed for the PCC, the PCC PDCCH is transmitted only on the PCC.

SCC PDCCH: indicates the PDCCH that schedules the SCC. More specifically, the SCC PDCCH indicates a PDCCH corresponding to the PDSCH on the SCC. When it is assumed that cross-carrier scheduling is allowed for the SCC, the SCC PDCCH may be transmitted on the PCC. On the other hand, if the cross-carrier scheduling is not allowed for the SCC, the SCC PDCCH is transmitted only on the SCC.

SR subframe: represents an uplink subframe that is configured for an SR transmission. Depending upon the exemplary implementation, the SR subframe may be defined as a subframe on which the SR information is transmitted, or a subframe on which the transmission of the SR information is allowed. The SR subframe may be specified by higher layer signaling (e.g., cyclic period, offset).

SR PUCCH resource: indicates a PUCCH resource that is configured for an SR transmission. The SR PUCCH resource is configured by a higher layer and may be specified, for example, by the CS, OCC, PRB, and so on.

HARQ-ACK PUCCH resource: indicates a PUCCH resource that is configured for the HARQ-ACK transmission. The HARQ-ACK PUCCH resource is allocated explicitly or implicitly. The HARQ-ACK PUCCH resource may be specified, for example, by the CS, OCC, PRB, or OCC, PRB in accordance with the PUCCH format.

ACK/NACK bundling: indicates that a logical AND operation is performed (or processed) to multiple ACK/NACK responses. More specifically, when all of the multiple ACK/NACK responses correspond to ACK, the ACK/NACK bundling result becomes ACK. And, if any one of the multiple ACK/NACK responses corresponds to NACK (or NACK/DTX), the ACK/NACK bundling result becomes NACK (or NACK/DTX).

Spatial bundling: represents performing a bundling on ACK/NACK(s) for a part or all of the transport block(s) on a corresponding CC.

CC bundling: represents performing a bundling on ACK/NACK(s) for a part or all of the transport block(s) on multiple CCs.

Cross-CC scheduling: represents an operation wherein all PDCCHs are being scheduled/transmitted through a single PCC.

Non-cross-CC scheduling: represents an operation wherein a PDCCH that schedules each CC is scheduled/transmitted through the corresponding CC.

The LTE-A system considers allowing cross-carrier scheduling for the DL PCC yet considers allowing only self-carrier scheduling for the DL SCC. In this case, a PDCCH scheduling a PDSCH of a DL PCC may be transmitted only on the DL PCC. Conversely, a PDCCH scheduling a PDSCH of the DL SCC may be transmitted on the DL PCC (cross-carrier scheduling), or on a corresponding DL SCC (self-carrier scheduling).

Embodiment 1

Figure 17:
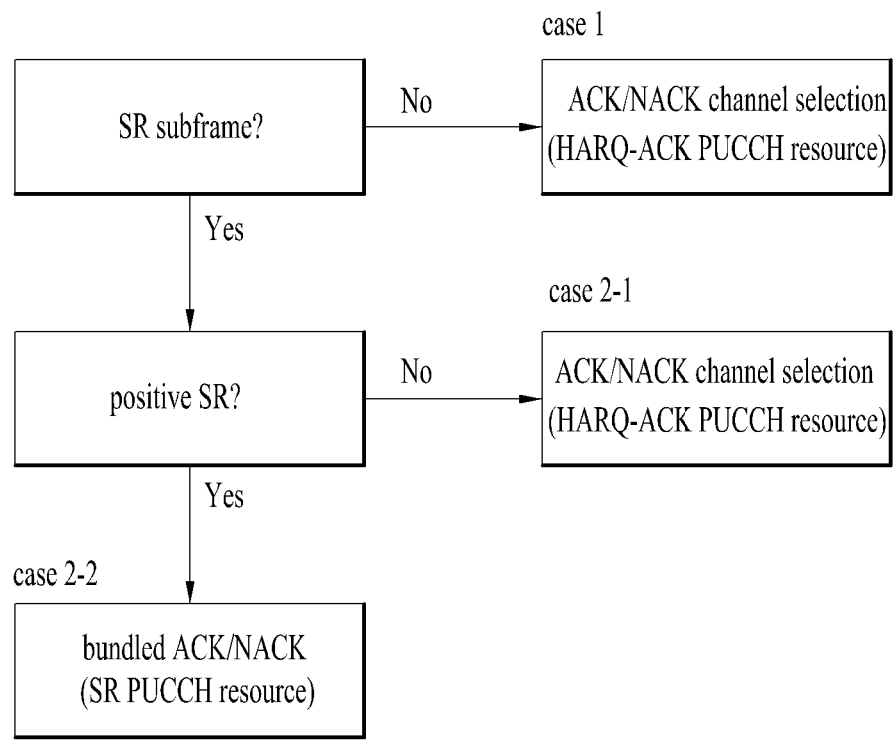
FIG. 17 illustrates an exemplary UCI transmitting method according to an embodiment of the present invention.

FIG. 17 illustrates an exemplary UCI transmitting method according to an embodiment of the present invention. It will be assumed in this example that the user equipment is configured to use the ACK/NACK channel selection method in the CA-based FDD system. It will also be assumed that this example is configured with one PCC and one SCC. The drawing shows an exemplary PUCCH resource allocation (or assignment) procedure, and the drawing is simply illustrated by focusing on the ACK/NACK and the SR. With respect to the ACK/NACK and the SR, three cases may be considered as shown below.

Case 1: transmit ACK/NACK at a non-SR subframe

Case 2-1: transmit ACK/NACK at an SR subframe, negative SR

Case 2-2: transmit ACK/NACK at an SR subframe, positive SR

Referring to FIG. 17, in case of Cases 1 and 2-1, the ACK/NACK state is transmitted by using the ACK/NACK channel selection method and the HARQ-ACK PUCCH resource. For example, the ACK/NACK may be transmitted by using the same method that is described with reference to Tables 5~6. More specifically, ACK/NACK state mapping tables of Tables 7~8 may be considered. Tables 7~8 respectively show a partial state, among the total ACK/NACK states, when PCC fallback is being performed. The mapping relation between the PUCCH resource, which is being used for transmitting the remaining ACK/NACK state, and the bit value may be arbitrarily defined in the present invention. More specifically, the mapping relation between the PUCCH resource, which is being used for transmitting the remaining ACK/NACK state, and the bit value is don't care (irrelevant) in the present invention.

TABLE 7

| | | SCC | | |
|---|---|---|---|---|
| PCC HARQ-ACK(0) | HARQ-ACK(1) | HARQ-ACK(2) | $b(0), \ldots, b(M_{bit} - 1)$ | d(0) |
| ACK | NACK/DTX | NACK/DTX | 1 (11) | −1 |
| NACK | NACK/DTX | NACK/DTX | 0 (00) | +1 |

Herein, HARQ-ACK(0) represents an ACK/NACK/DTX response for a CW (or TB) of the PCC. HARQ-ACK(1)

represents an ACK/NACK/DTX response for CW1 (or TB1) of SCC, and HARQ-ACK(2) represents an ACK/NACK/DTX response for CW2 (or TB2) of SCC. The ACK/NACK/DTX response includes ACK, NACK, DTX or NACK/DTX. In the PCC, the NACK includes NACK, DTX or NACK/DTX. d(0) corresponding to the ACK/NACK state is transmitted by using an implicit PUCCH resource, and the implicit PUCCH resource is liked to a PDCCH that is used for scheduling the CW (or TB) of the PCC (e.g., see Equation 1). PUCCH formats 1a/1b and, more preferably, PUCCH format 1b may be used.

TABLE 8

| PCC | | SCC | | $b(0), \ldots,$ | |
|---|---|---|---|---|---|
| HARQ-ACK(0) | HARQ-ACK(1) | HARQ-ACK(2) | HARQ-ACK(3) | $b(M_{bit} - 1)$ | d(0) |
| ACK | ACK | NACK/DTX | NACK/DTX | 11 | −1 |
| ACK | NACK | NACK/DTX | NACK/DTX | 10 | j |
| NACK | ACK | NACK/DTX | NACK/DTX | 01 | −j |
| NACK | NACK | NACK/DTX | NACK/DTX | 00 | 1 |

Herein, HARQ-ACK(0) represents an ACK/NACK/DTX response for CW1 (or TB1) of the PCC, and HARQ-ACK(1) represents an ACK/NACK/DTX response for CW2 (or TB2) of the PCC. HARQ-ACK(2) represents an ACK/NACK/DTX response for CW1 (or TB1) of the SCC, and HARQ-ACK(3) represents an ACK/NACK/DTX response for CW2 (or TB2) of the SCC. The ACK/NACK/DTX response includes ACK, NACK, DTX or NACK/DTX. In the PCC, the NACK includes NACK, DTX or NACK/DTX. d(0) corresponding to the ACK/NACK state is transmitted by using an implicit PUCCH resource, and the implicit PUCCH resource is liked to a PDCCH that is used for scheduling the CW (or TB) of the PCC (e.g., see Equation 1). PUCCH format 1b may be used.

Conversely, in case of Case 2-2, spatially bundled and/or CC-bundled ACK/NACK information respective to multiple ACK/NACKs of multiple CCs may be transmitted through the SR PUCCH. The SR PUCCH resource means a PUCCH resource (e.g., PUCCH format 1 resource), which is determined by a higher layer for the SR transmission. Preferably, it may be considered to transmit the ACK/NACK information for the PCC (in case of a non-MIMO PCC) or the spatially bundled ACK/NACK information for the PCC (in case of a MIMO PCC) and the bundled ACK/NACK information respective to all of the remaining SCCs (secondary DL CCs) by using the SR PUCCH resource. When two CCs (i.e., 1 PCC+1 SCC) are aggregated, the description presented above may be understood in the sense that ACK/NACK information that is spatially bundled for each CC may be transmitted by using the SR PUCCH resource.

Table 9 below shows an exemplary mapping method for bundled ACK/NACK according to this embodiment.

TABLE 9

| PCC Bundled HARQ-ACK(0) | SCC Bundled HARQ-ACK(1) | $b(0), \ldots,$ $b(M_{bit} - 1)$ | d(0) |
|---|---|---|---|
| ACK | ACK | 11 | −1 |
| ACK | NACK | 10 | j |
| NACK | ACK | 01 | −j |
| NACK | NACK | 00 | 1 |

Herein, bundled HARQ-ACK(0) represents a spatially bundled ACK/NACK/DTX response for all CWs (or TBs) of the PCC, and HARQ-ACK(1) represents a spatially bundled ACK/NACK/DTX response for all CWs (or TBs) of the SCC. The NACK includes NACK, DTX or NACK/DTX. In case of this example, ACK is encoded as 1, and NACK is encoded as 0. b(0)b(1) is modulated in accordance with the table shown above, and the modulation symbol d(0) is transmitted by using the PUCCH resource, which is determined for the SR transmission. PUCCH format 1b may be used.

Preferably, a combination of the bundled ACK/NACK for the PCC and the bundled ACK/NACK for the SCC (i.e., bundled ACK/NACK state) may be mapped to the SR PUCCH resource for a prevention of a non-conformity between the base station and the user equipment during a DL CC reconfiguration section.

Figure 18:
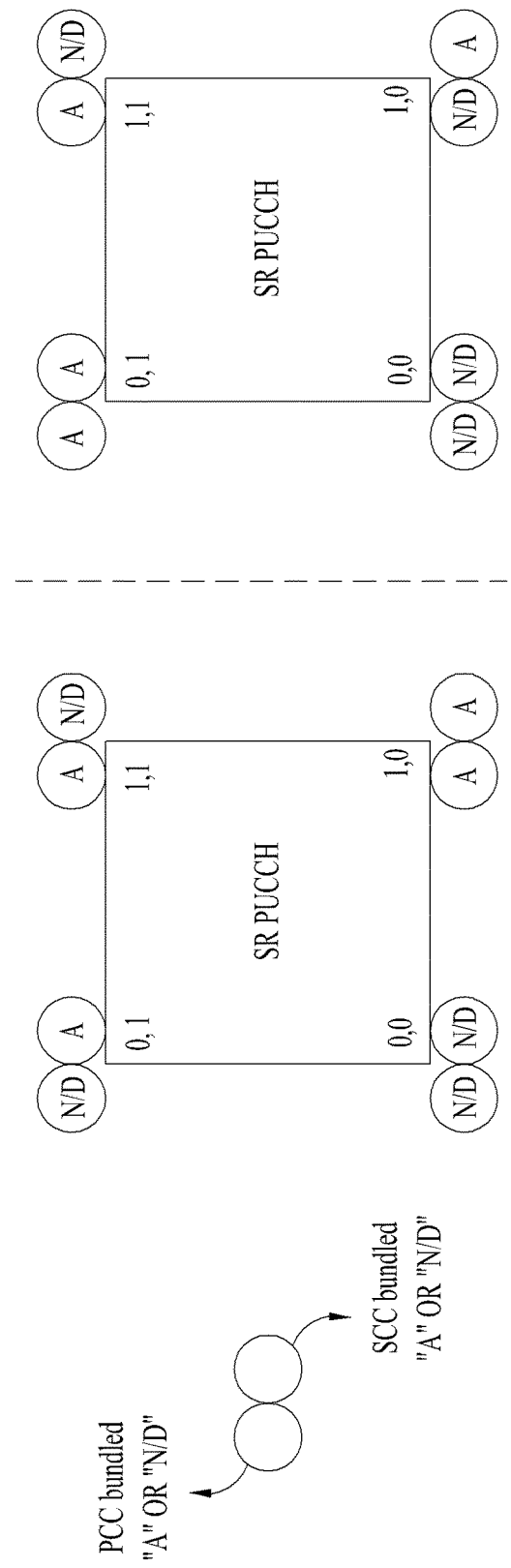
FIG. 18 illustrates a bundled ACK/NACK transmitting method according to an embodiment of the present invention.

FIG. 18 illustrates a bundled ACK/NACK transmitting method according to an embodiment of the present invention.

Referring to FIG. 18, "ACK+NACK/DTX", which corresponds to a bundled ACK/NACK state (hereinafter referred to as a B-A/N state), respective to the bundled ACK/NACK for all CWs of the PCC (hereinafter referred to as PB-A/N) and to the bundled ACK/NACK for all CWs of the SCC (hereinafter referred to as SB-A/N) may be mapped to a constellation point corresponding to "ACK" of PUCCH format 1a or "ACK+ACK" of PUCCH format 1b. Subsequently, "NACK/DTX+NACK/DTX", which corresponds to a B-A/N state, respective to the PB-A/N and the SB-A/N may be mapped to a constellation point corresponding to "NACK" of PUCCH format 1a or "NACK+NACK" of PUCCH format 1b. Finally, the B-AN state, wherein the PB-A/N and the SB-A/N respectively correspond to ACK+ACK, NACK/DTX+ACK, may be arbitrarily mapped to the remaining two constellation points, to which the B-A/N states ACK+NACK/DTX, NACK/DTX+NACK/DTX are not mapped. According to this example, during the DL CC reconfiguration section, the bundled ACK/NACK response at least for a case that only the PCC is scheduled may operate normally.

Tables 10~11 respectively show the exemplary ACK/NACK mapping method shown in FIG. 18.

TABLE 10

| PCC Bundled HARQ-ACK(0) | SCC Bundled HARQ-ACK(1) | $b(0), \ldots,$ $b(M_{bit} - 1)$ | d(0) |
|---|---|---|---|
| ACK | NACK | 11 | −1 |
| ACK | ACK | 10 | j |
| NACK | ACK | 01 | −j |
| NACK | NACK | 00 | 1 |

TABLE 11

| PCC Bundled HARQ-ACK(0) | SCC Bundled HARQ-ACK(1) | $b(0), \ldots,$ $b(M_{bit} - 1)$ | d(0) |
|---|---|---|---|
| ACK | NACK | 11 | −1 |
| NACK | ACK | 10 | j |
| ACK | ACK | 01 | −j |
| NACK | NACK | 00 | 1 |

Herein, bundled HARQ-ACK(0) represents a spatially bundled ACK/NACK/DTX response for all CWs (or TBs) of the PCC, and HARQ-ACK(1) represents a spatially bundled ACK/NACK/DTX response for all CWs (or TBs) of the SCC. The NACK includes NACK, DTX or NACK/DTX. b(0)b(1) is modulated in accordance with the table shown above, and the modulation symbol d(0) is transmitted by using the PUCCH resource, which is configured for the SR transmission. PUCCH format 1b may be used.

Embodiment 2

This embodiment describes a method for efficiently transmitting an ACK/NACK and an SR, in a CA-based FDD system, when the system is configured so that the user equipment can use the ACK/NACK channel selection method.

In the LTE-A system, in case of the MIMO transmission mode CC, on which a maximum of 2 CWs can be transmitted for the ACK/NACK channel selection, an ACK/NACK channel selection method either using 2 implicit PUCCH resources, each being linked to a lowest CCE index ($n_{CCE}$) of the PDCCH scheduling the corresponding CC and linked to the next CCE index ($n_{CCE}+1$), or using one implicit PUCCH resource and one explicit PUCCH resource, which is in advance allocated by the RRC, may be considered. Additionally, in the LTE-A system, in case of the non-MIMO transmission mode CC, in which a maximum of 1 CW can be transmitted for the ACK/NACK channel selection, an ACK/NACK channel selection method using only one implicit PUCCH #1, which is linked to a lowest CCE index ($n_{CCE}$) of the PDCCH scheduling the respective CC, may be considered.

Table 12 below shows an exemplary ACK/NACK state-to-symbol (S) mapping for the ACK/NACK channel selection, in case 2 CCs are configured herein (1 MIMO CC+1 non-MIMO CC). Herein, S represents a BPSK or QPSK symbol being mapped/transmitted on an arbitrary constellation within the PUCCH resource, and the number of symbols per PUCCH resource may be varied in accordance with the overall number of ACK/NACK states.

TABLE 12

| A/N State | MIMO CC PUCCH #1 | MIMO CC PUCCH #2 | non-MIMO CC PUCCH #1 |
|---|---|---|---|
| State #0 | S0 | 0 | 0 |
| State #1 | S1 | 0 | 0 |
| State #2 | 0 | S0 | 0 |
| State #3 | 0 | S1 | 0 |
| State #4 | 0 | 0 | S0 |
| State #5 | 0 | 0 | S1 |

At this point, an ACK/NACK state including DTX information respective to a particular CC (i.e., a failure to receive/detect PDCCH that schedules the respective CC) may not be mapped/transmitted to/on any position within the implicit PUCCH resource, which is linked to the PDCCH that schedules the corresponding CC (i.e., which is linked to the corresponding CC). Since the DTX represents that an implicit PUCCH resource being linked to the corresponding CC is not available, the ACK/NACK state cannot be transmitted by using the corresponding resource. More specifically, the implicit PUCCH resource that is linked to a particular CC and the ACK/NACK state that is mapped to the corresponding resource may be available/transmitted, only when the reception/detection of the PDCCH that schedules the corresponding CC is successfully performed.

Under such conditions, when an ACK/NACK is required to be transmitted at a non-SR subframe, the ACK/NACK state may be transmitted by using the ACK/NACK channel selection method without any modification (e.g., see Tables 5~6). Conversely, when an ACK/NACK is required to be transmitted at an SR subframe, the ACK/NACK and the SR may be transmitted by using an RS selection between HARQ-ACK PUCCH resources, or by using a PUCCH selection between an ACK/NACK and an SR PUCCH resource. Herein, RS selection represents a method for identifying (or differentiating) negative/positive SRs based upon whether or not the ACK/NACK state on the first PUCCH resource (i.e., the ACK/NACK that is mapped to a data part of the first PUCCH resource) is transmitted along with an RS of the first PUCCH resource (i.e., an RS having the same CCS/OCC as the corresponding PUCCH resource or an RS having the same CCS/OCC as the data part of the corresponding PUCCH resource), or based upon whether or not the ACK/NACK state on the first PUCCH resource is transmitted along with an RS of a second PUCCH resource. And, a PUCCH selection represents a method for identifying (or differentiating) negative/positive SRs based upon whether or not the ACK/NACK state is transmitted by using the first PUCCH resource and the RS of the corresponding resource, or based upon whether or not the corresponding ACK/NACK state is transmitted by using the second PUCCH resource and the RS of the corresponding resource. More specifically, with respect to the ACK/NACK states over 2 PUCCH resources, which are linked to the MIMO mode CC, the negative/positive SRs may be identified by applying the RS selection between the corresponding PUCCH resources (Rule 1). And, with respect to the ACK/NACK states over 1 PUCCH resource, which is linked to the non-MIMO mode CC, the negative/positive SRs may be identified by applying the PUCCH selection between the corresponding PUCCH resource and the SR PUCCH resource (Rule 2).

Meanwhile, when considering the ACK/NACK channel selection using the implicit PUCCH resource, the ACK/NACK state, which is NACK/DTX respective to all CWs of all CCs (i.e., all being in an "N/D" state), may not be partially transmitted, due to the characteristics of the implicit PUCCH resource. For example, for the PCC fallback, only a state (i.e., PCC NACK fallback state), that corresponds to "N" for all CWs of the PCC and that corresponds to "N/D" for all CWs of the SCC, may be transmitted though an implicit PUCCH resource, which is linked to the PCC, and the transmission of the state, that corresponds to "D" for all CWs of the PCC and corresponds to "N/D" for all CWs of the SCC, can be dropped (or abandoned). However, in case of the positive SR, since the SR PUCCH resource (i.e., explicit PUCCH resource) can be used, in case of the positive SR, in order to transmit all states corresponding to "N/D", the corresponding state may be mapped to the SR PUCCH resource (Rule 3). Preferably, in case the PCC is the MIMO mode, RS selection is not applied to the positive SR+PCC NACK fallback state, and the positive SR+PCC NACK fallback state may be replaced with the mapping/transmission of all "N/D" states on the SR PUCCH resource. By adopting this method, scheduling may be requested to the base station through the positive SR transmission, even in a situation when available implicit PUCCH resources do not exist, or in a situation when the PDCCH/PDSCH that are received by the corresponding user equipment do not exist.

Tables 13~15 respectively show an exemplary mapping method for performing SR+ACK/NACK transmission, when 2 CCs are allocated. Table 13 shows a case being configured of 1 MIMO CC+1 non-MIMO CC, Table 14 shows a case being configured of 2 MIMO CCs, and Table 15 shows a case being configured of 2 non-MIMO CCs.

In all of the following tables, "nSR" represents a negative SR, and "pSR" represents a negative SR. More specifically, Rule 1 may be applied for the ACK/NACK states of the 2 PUCCHs linked to the MIMO CC, and Rule 2 may be applied for the ACK/NACK state of the 1 PUCCH linked to the non-MIMO CC. Additionally, by applying Rule 3, when all ACK/NACK states corresponding to "N/D" are transmitted by using an SR PUCCH resource, in case of the positive SR, a separate process of PCC NACK fallback state mapping for the positive SR may be omitted. Meanwhile, in case of Table 15 (i.e., when multiple non-MIMO CCs exist), all of the ACK/NACK states, which are mapped to the multiple non-MIMO CCs, may each be mapped to different constellation points within the SR PUCCH resource for positive SR transmission.

TABLE 13

| SR + A/N State | MIMO CC PUCCH #1 Data part | MIMO CC PUCCH #1 RS part | MIMO CC PUCCH #2 Data part | MIMO CC PUCCH #2 RS part | non-MIMO CC PUCCH #1 | SR PUCCH |
|---|---|---|---|---|---|---|
| nSR + State#0 | S0 | 1 | 0 | 0 | 0 | 0 |
| nSR + State#1 | S1 | 1 | 0 | 0 | 0 | 0 |
| nSR + State#2 | 0 | 0 | S0 | 1 | 0 | 0 |
| nSR + State#3 | 0 | 0 | S1 | 1 | 0 | 0 |
| nSR + State#4 | 0 | 0 | 0 | 0 | S0 | 0 |
| nSR + State#5 | 0 | 0 | 0 | 0 | S1 | 0 |
| pSR + State#0 | S0 | 0 | 0 | 1 | 0 | 0 |
| pSR + State#1 | S1 | 0 | 0 | 1 | 0 | 0 |
| pSR + State#2 | 0 | 1 | S0 | 0 | 0 | 0 |
| pSR + State#3 | 0 | 1 | S1 | 0 | 0 | 0 |
| pSR + State#4 | 0 | 0 | 0 | 0 | 0 | S0 |
| pSR + State#5 | 0 | 0 | 0 | 0 | 0 | S1 |
| (pSR + all"N/D") | 0 | 0 | 0 | 0 | 0 | (S2) |

TABLE 14

| SR + A/N State | MIMO CC #1 PUCCH #1 Data | MIMO CC #1 PUCCH #1 RS | MIMO CC #1 PUCCH #2 Data | MIMO CC #1 PUCCH #2 RS | MIMO CC #2 PUCCH #1 Data | MIMO CC #2 PUCCH #1 RS | MIMO CC #2 PUCCH #2 Data | MIMO CC #2 PUCCH #2 RS | SR PUCCH |
|---|---|---|---|---|---|---|---|---|---|
| nSR + State#0 | S0 | 1 | 0 | 0 | 0 | 0 | 0 | 0 | 0 |
| nSR + State#1 | S1 | 1 | 0 | 0 | 0 | 0 | 0 | 0 | 0 |
| nSR + State#2 | 0 | 0 | S0 | 1 | 0 | 0 | 0 | 0 | 0 |
| nSR + State#3 | 0 | 0 | S1 | 1 | 0 | 0 | 0 | 0 | 0 |
| nSR + State#4 | 0 | 0 | 0 | 0 | S0 | 1 | 0 | 0 | 0 |
| nSR + State#5 | 0 | 0 | 0 | 0 | S1 | 1 | 0 | 0 | 0 |
| nSR + State#6 | 0 | 0 | 0 | 0 | 0 | 0 | S0 | 1 | 0 |
| nSR + State#7 | 0 | 0 | 0 | 0 | 0 | 0 | S1 | 1 | 0 |
| pSR + State#0 | S0 | 0 | 0 | 1 | 0 | 0 | 0 | 0 | 0 |
| pSR + State#1 | S1 | 0 | 0 | 1 | 0 | 0 | 0 | 0 | 0 |
| pSR + State#2 | 0 | 1 | S0 | 0 | 0 | 0 | 0 | 0 | 0 |
| pSR + State#3 | 0 | 1 | S1 | 0 | 0 | 0 | 0 | 0 | 0 |
| pSR + State#4 | 0 | 0 | 0 | 0 | S0 | 0 | 0 | 1 | 0 |
| pSR + State#5 | 0 | 0 | 0 | 0 | S1 | 0 | 0 | 1 | 0 |
| pSR + State#6 | 0 | 0 | 0 | 0 | 0 | 1 | S0 | 0 | 0 |
| pSR + State#7 | 0 | 0 | 0 | 0 | 0 | 1 | S1 | 0 | 0 |
| pSR + all"N/D" | 0 | 0 | 0 | 0 | 0 | 0 | 0 | 0 | S0 |

TABLE 15

| SR + A/N State | non-MIMO CC #1 PUCCH #1 | non-MIMO CC #2 PUCCH #1 | SR PUCCH |
|---|---|---|---|
| nSR + State#0 | S0 | 0 | 0 |
| nSR + State#1 | S1 | 0 | 0 |
| nSR + State#2 | 0 | S0 | 0 |
| nSR + State#3 | 0 | S1 | 0 |
| pSR + State#0 | 0 | 0 | S0 |
| pSR + State#1 | 0 | 0 | S1 |
| pSR + State#2 | 0 | 0 | S2 |
| pSR + State#3 | 0 | 0 | S3 |

Embodiment 3

This embodiment describes a method for efficiently transmitting an ACK/NACK and an SR, in a CA-based FDD system, when the system is configured so that the user equipment can use the ACK/NACK channel selection method or the multi-bit UCI coding method.

When considering a method for multiplexing the SR and the ACK/NACK by using both SR resource and ACK/NACK resource, in order to prevent any non-conformity between the base station and the user equipment at least with respect to PCC scheduling within the CC reconfiguration section (or period), a mapping that is similar to the above-described PCC fallback may be applied in the SR PUCCH resource. More specifically, in case of a positive SR, an A/N state corresponding to "A" or "N/D" for the PCC (or each CW of the PCC) and an A/N state corresponding "N/D" for each of the remaining SCCS (or each CW of the remaining SCCs) may each be mapped/transmitted through the SR PUCCH resource. Preferably, the mapping positions of "A", "N/D" for the PCC (or each CW of the PCC), which are mapped to each constellation point of the SR PUCCH resource may preferably be identical to the mapping positions of "A", "N", which are defined for a single CC allocation/operation (e.g., the mapping positions of "A", "N" within PUCCH format 1a, or the mapping positions of "A", "N" for each CW within PUCCH format 1b).

Figure 19:
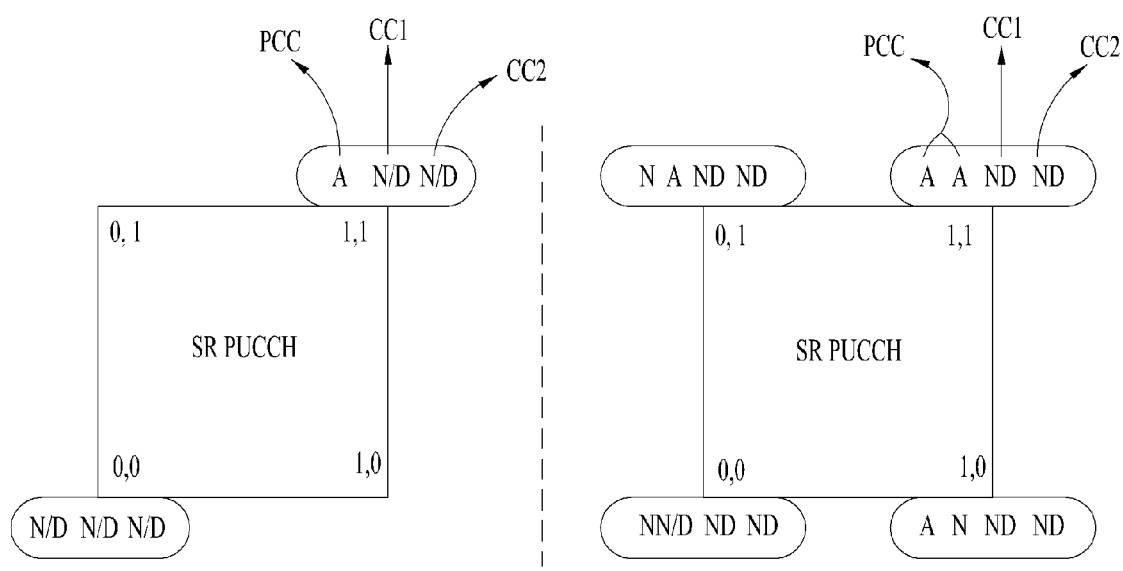
FIG. 19 illustrates an exemplary UCI transmitting method according to another embodiment of the present invention.

FIG. 19 illustrates an exemplary UCI transmitting method according to another embodiment of the present invention. Referring to FIG. 19, the mapping positions of A, N/D for the PCC (or each CW of the PCC), which are mapped to each constellation point of the SR PUCCH resource may preferably be identical to the mapping positions of A, N, which are defined for a single CC allocation/operation (e.g., the mapping positions of A, N within PUCCH format 1a, or the mapping positions of A, N for each CW within PUCCH format 1b).

Preferably, in case the user equipment receives only the PCC scheduling, i.e., the PDSCH that is scheduled/transmitted through PCC (referring to the PDSCH or PDCCH (e.g., PDCCH ordering (or commanding) an SPS release) each requiring an ACK/NACK response), the mapping method according to this embodiment of the present invention may be applied. More specifically, in case of a positive SR, an A/N state that corresponds to "A" or "N" for the PCC (or each CW of the PCC) and corresponds to "DTX" for each of the remaining SCCs (or each CW of the remaining SCCs) may be mapped/transmitted to/through the SR PUCCH resource. In other words, this example corresponds to a case that the "N/D" of the PCC is changed to "N", and the "N/D" of each SCC (CC1, CC2) is changed to "D" in FIG. 19.

Additionally, in another example, the application of the mapping method according to the embodiment of the present invention may be limited only to the case when the user equipment does not receive even a single PDSCH (referring to the PDSCH or PDCCH (e.g., PDCCH ordering (or commanding) an SPS release) each requiring an ACK/NACK response)) through all CCs. More specifically, in case of a positive SR, an A/N state, that corresponds to "DTX" for the PCC (or each CW of the PCC) and corresponds to "DTX" for each of the remaining SCCS (or each CW of the remaining SCCs), may be mapped/transmitted to/through the SR PUCCH resource. In other words, this example corresponds to a case that the A/N state corresponding to "A,N/D,N/D" is omitted, and the "N/D" of both the PCC and SCCs (CC1, CC2) are changed to "D" in FIG. 19.

The A/N state mapping within the SR resource may each be applied to a case when FDD ACK/NACK transmission is performed by using an E-PUCCH format based "multi-bit UCI coding" method or by using a minimum and/or explicit PUCCH resource based "ACK/NACK channel selection" method.

Figure 20:
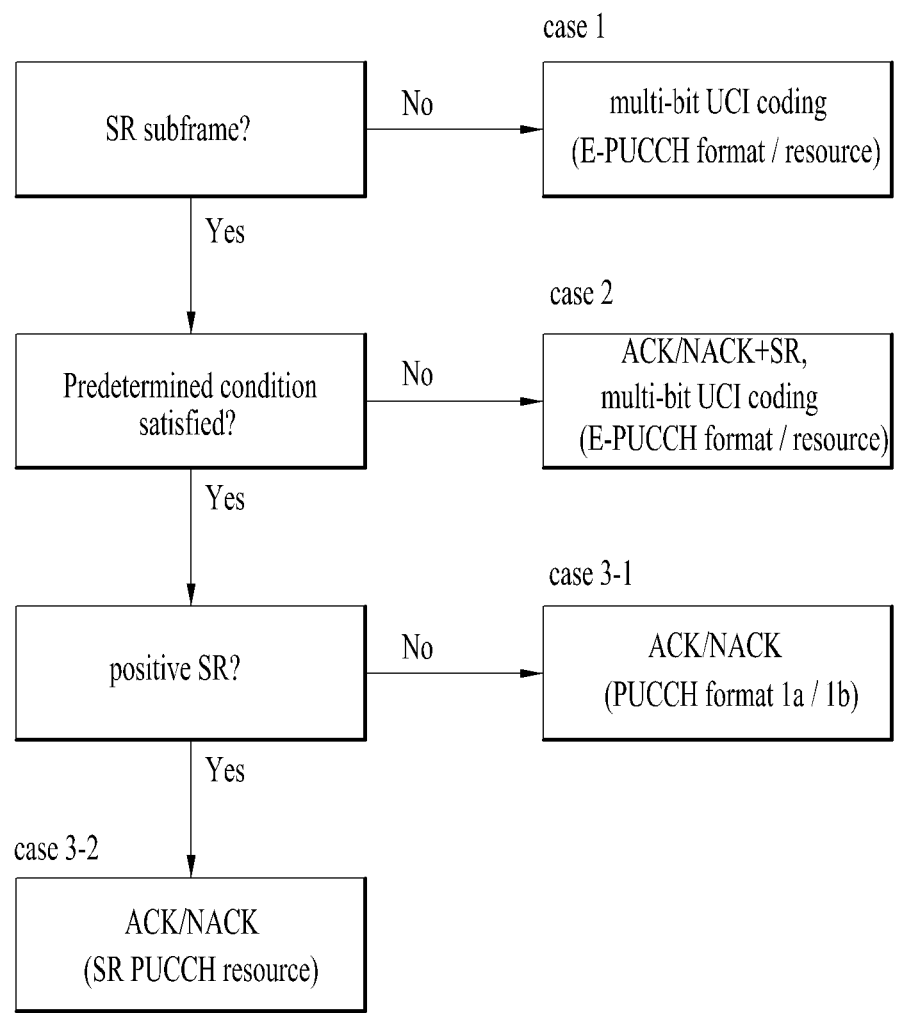
FIG. 20 illustrates an exemplary UCI transmitting method according to yet another embodiment of the present invention.

FIG. 20 illustrates an exemplary UCI transmitting method according to yet another embodiment of the present invention. For simplicity, it will be assumed that the ACK/NACK is transmitted by using the multi-bit UCI coding method. The drawing shows an exemplary PUCCH resource allocation procedure mostly focusing on the ACK/NACK and the SR.

With respect to the ACK/NACK and the SR, four cases may be considered as shown below.

Case 1: transmit ACK/NACK at a non-SR subframe
Case 2: transmit ACK/NACK at an SR subframe, predetermined condition not satisfied
Case 3-1: transmit ACK/NACK at an SR subframe, predetermined condition satisfied, negative SR
Case 3-2: transmit ACK/NACK at an SR subframe, predetermined condition satisfied, positive SR Referring to FIG. 20, in case of Case 1, the ACK/NACK is transmitted by using the multi-bit UCI coding method. More specifically, the ACK/NACK is transmitted by using the E-PUCCH format/resource, which is described above with reference to FIG. 12~13. The HARQ-ACK PUCCH resource for the E-PUCCH format may be explicitly allocated (or assigned) by using the ARI. As shown in Table 4, the HARQ-ACK PUCCH resource for the E-PUCCH format may be indicated by a TPC (Transmit Power Control) field value of at least one or more SCC PDCCHs.

Cases 2, 3-1 and 3-2 respectively show exemplary cases when the ACK/NACK is to be transmitted at an SR subframe. Case 2 indicates a case when a predetermined condition is not satisfied, and Cases 3-1/3-2 respectively indicates a case when a predetermined condition is satisfied.

Herein, the predetermined condition includes a case when the ACK/NACK state corresponds to "A" or "N/D" for the PCC (or each CW of the PCC) and corresponds to "D" for the remaining SCCs (or each CW of the remaining SCCs). In other words, the predetermined condition includes a case when one PDSCH or one SPS release PDCCH is detected only on the PCC. When the predetermined condition is not satisfied (i.e., Case 2), the user equipment may perform joint coding on the ACK/NACK information and the SR information (e.g., 1-bit for indicating negative/positive SR)(e.g., negative SR: 0, positive SR: 1) and may then transmit the joint-coded information. The joint-coded ACK/NACK+SR may be transmitted by using the E-PUCCH format/resource. When the predetermined condition is satisfied, and when the SR corresponds to a negative SR (i.e., Case 3-1), the user equipment may transmit the ACK/NACK by using PUCCH formats 1a/1b and the implicit PUCCH resource of the conventional LTE system. Alternatively, when the predetermined condition is satisfied, and when the SR corresponds to a positive SR (i.e., Case 3-2), the user equipment may transmit the ACK/NACK by using the PUCCH resource, which is configured for the SR transmission. In this case, the ACK/NACK may be transmitted by using the PUCCH formats 1a/1b.

Embodiment 4

The conventional LTE TDD system uses an ACK/NACK bundling method and an ACK/NACK channel selection method in order to transmit the ACK/NACK. Meanwhile, when the ACK/NACK is transmitted at an SR subframe and when the respective SR corresponds to a negative SR, the user equipment transmits the ACK/NACK by using a configured ACK/NACK transmission method (i.e., ACK/NACK bundling or ACK/NACK channel selection) and HARQ-ACK PUCCH resources. Conversely, when the ACK/NACK is transmitted at the SR subframe and when the respective SR corresponds to a positive SR, the user equipment maps a number of ACKs (i.e., ACK counter) for the PDSCH, which is received through multiple DL subframes, to constellation points [b(0), b(1)] within the SR resource, thereby transmitting the ACKs.

Table 16 below shows a relation between the number of ACKs and b(0), b(1) within the conventional LTE TDD.

TABLE 16

| Number of ACK among multiple ($U_{DAI}$ + $N_{SPS}$) ACK/NACK responses | b(0), b(1) |
|---|---|
| 0 or None (UE detect at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

Herein, $U_{DAI}$ represents a total number of PDCCH(s) having allocated PDSCH transmission and PDCCHs indicating downlink SPS release, which are detected by the user equipment from subframe(s) n−k (k∈K). $N_{SPS}$ indicates a number of PDSCH transmissions without corresponding PDCCH within the subframe(s) n−k (k∈K). Subframe n corresponds to the SR subframe.

K is given by a UL-DL configuration. And, Table 17 below shows K: $\{k_0, k_1, \ldots k_{M-1}\}$, which is defined in the conventional LTE TDD.

TABLE 17

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Hereinafter, a method enabling the user equipment to efficiently transmit the ACK/NACK and the SR in the CA based TDD system will be described. In the TDD system, when multiple CCs are aggregated, it may be considered to transmit multiple ACK/NACK information/signals respective to multiple PDSCHs, which are received through multiple DL subframes and multiple CCs, through a specific CC (i.e., A/N CC) at a UL subframe, which corresponds to the respective multiple DL subframes.

Two different methods for the ACK/NACK transmission may be considered as described below.

Full ACK/NACK method: a plurality of ACK/NACKs corresponding to a maximum number of CWs, which can be transmitted through all CCs allocated to the user equipment and multiple DL subframes (i.e., SF n−k (k∈K)), may be transmitted.

Bundled ACK/NACK method: a total number of transmitted ACK/NACK bits may be reduced by applying at least one of CW bundling, CC bundling, and subframe (SF) bundling, thereby being transmitted.

CW bundling refers to applying ACK/NACK bundling for each CC with respect to each DL SF. CC bundling refers to applying ACK/NACK bundling to all CCs or a portion of the CCs with respect to each DL SF. SF bundling refers to applying ACK/NACK bundling to each CC with respect to all DL SFs or a portion of the DL SFs. ACK/NACK bundling refers to a logical AND operation process to multiple ACK/NACK responses. Meanwhile, in case of SF bundling, an "ACK-counter" method, which notifies a total number of ACKs (or a number of some of the ACKs) for each CC with respect to all PDSCHs or DL grant PDCCHs received for each CC, may be additionally considered. In this embodiment, the ACK counter may be defined as described (or defined) in Table 16, or may be defined as described below. The difference between the definition shown in Table 16 and the definition described below is that the number of ACKs is counted as 0, when at least one NACK exists.

ACK counter: corresponds to a method for notifying a total number of ACKs (or a partial number of ACKs), which are received for all PDSCHs. More specifically, the number of ACKs is notified by the user equipment, only when all of the received PDSCHs correspond to ACK, and when no DTX is detected. And, when the user equipment detects the DTX, or when at least one NACK exists for the received PDSCH, the number of ACKs may be notified as 0 (processed as DTX or NACK).

Meanwhile, an ACK/NACK payload, which is generated by using the full ACK/NACK method or the bundled ACK/NACK method, may be transmitted by using a "multi-bit UCI coding" or "ACK/NACK channel selection" based ACK/NACK transmission method. The "multi-bit UCI coding" or "ACK/NACK channel selection" may be adaptively applied based upon an ACK/NACK payload size.

Preferably, for a positive SR in the SR subframe, and when only the PCC scheduling PDSCH(s) (i.e., PDSCH(s) being scheduled/transmitted through the PCC) is/are received in the multiple DL subframes corresponding to the SR subframe, the user equipment may map/transmit the ACK/NACK on the SR resource by applying an ACK counter or SF bundling method for only the PDSCH of the PCC. In the SR subframe, for a negative SR, the user equipment may transmit the ACK/NACK by using "multi-bit UCI coding" or "ACK/NACK channel selection" and HARQ-ACK PUCCH resources.

Preferably, for a positive SR in the SR subframe, and when not a single PDSCH is received through all CCs within the multiple DL subframes corresponding to the SR subframe, the user equipment may map/transmit the ACK/NACK on the SR resource by applying an ACK counter or SF bundling method for only the PDSCH of the PCC. In the SR subframe, for a negative SR, the user equipment may transmit the ACK/NACK by using "multi-bit UCI coding" or "ACK/NACK channel selection" and HARQ-ACK PUCCH resources.

Preferably, when multi-bit UCI coding is applied for TDD ACK/NACK transmission, for a positive SR in the SR subframe, and when the ACK/NACK(s) for the PDSCH, which is received through all secondary CC(s) excluding the PCC, corresponds to NACK or DTX, the user equipment may map/transmit ACK counter information respective to the multiple DL subframes of the PCC on the SR resource. In the SR subframe, for a negative SR, the user equipment may transmit the ACK/NACK by using "multi-bit UCI coding" or "ACK/NACK channel selection" and HARQ-ACK PUCCH resources.

Preferably, when ACK counter based ACK/NACK channel selection is applied for TDD ACK/NACK transmission and when the SR subframe corresponds to a positive SR, the user equipment may always map/transmit the ACK counter information respective to the multiple DL subframes of the PCC, regardless of whether or not a PDSCH, which is scheduled to the secondary CC(s), is received (and regardless of the respective ACK/NACK response). In the SR subframe, for a negative SR, the user equipment may transmit the ACK/NACK by using "multi-bit UCI coding" or "ACK/NACK channel selection" and HARQ-ACK PUCCH resources.

Additionally, in a TDD situation, a case when a DAI (Downlink Assignment Index) is independently operated for each CC may be considered. More specifically, a case when DAI signaling is performed only to the PDSCH of the corresponding CC through a PDCCH. Preferably, the DAI may correspond to a DAI-counter (e.g., a parameter notifying a scheduling order of the PDSCH, which is scheduled based upon a pre-decided order (e.g., DL subframe order)). In case of using the DAI-counter, the user equipment may perform operations of 1) notifying the number of ACKs to the base station, only when the number of received DAIs is equal to the total number of ACKs, to the base station or 2) notifying a number of ACKs corresponding to the DAI-counter value, which is consecutively (or continuously) increased starting from an initial DAI-counter value (or starting from the respective PDSCH), to the base station. The DAI may have the initial values of 0 or 1.

Preferably, for a positive SR in the SR subframe, and when the user equipment receives a PDSCH corresponding to a PDCCH with an initial DAI value, a single PDCCH indicating SPS release, and/or a single SPS PDSCH (i.e., PDSCH without corresponding PDCCH) only through the PCC, the user equipment may map/transmit ACK/NACK information (e.g., ACK counter information) on the PDSCH corresponding to the initial DAI or the PDCCH and/or the SPS PDSCH of the PCC. Additionally, for a positive SR in the SR subframe, when not a single PDSCH or PDCCH is received through all CCs within the multiple DL subframes corresponding to the SR subframe (i.e., when no PDSCH or PDCCH transmission is performed with respect to the user equipment), the user equipment may map/transmit a bit value (or modulation value) corresponding to number of ACKs=0 on the SR resource. In the SR subframe, for a negative SR, the user equipment may transmit the ACK/NACK by using "multi-bit UCI coding" or "ACK/NACK channel selection" and HARQ-ACK PUCCH resources.

Figure 21:
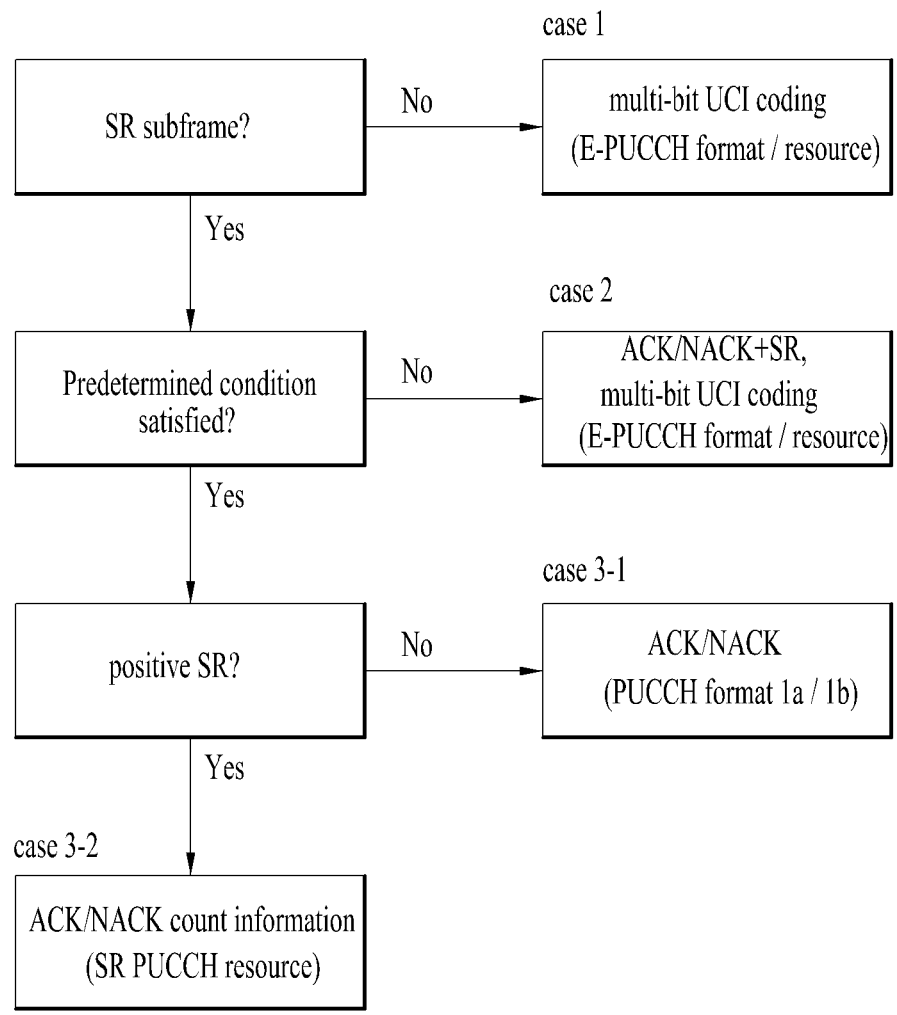
FIG. 21 illustrates an exemplary UCI transmitting method according to yet another embodiment of the present invention.

FIG. 21 illustrates an exemplary UCI transmitting method according to yet another embodiment of the present invention. For simplicity, it will be assumed that the ACK/NACK is transmitted by using the multi-bit UCI coding method. The drawing shows an exemplary PUCCH resource allocation procedure mostly focusing on the ACK/NACK and the SR.

With respect to the ACK/NACK and the SR, four cases may be considered as shown below.

Case 1: transmit ACK/NACK at a non-SR subframe
Case 2: transmit ACK/NACK at an SR subframe, predetermined condition not satisfied
Case 3-1: transmit ACK/NACK at an SR subframe, predetermined condition satisfied, negative SR
Case 3-2: transmit ACK/NACK at an SR subframe, predetermined condition satisfied, positive SR Referring to FIG. 21, in case of Case 1, the ACK/NACK is transmitted by using the multi-bit UCI coding method. More specifically, the ACK/NACK is transmitted by using the E-PUCCH format/resource, which is described above with reference to FIG. 12~13. The PUCCH resource for the E-PUCCH format may be explicitly allocated (or assigned). As shown in Table 4, the PUCCH resource may be indicated by using an ARI, which is signaled through a specific PDCCH. Herein, the specific PDCCH may correspond to any one of the PDCCHs excluding a PDCCH having an initial DAI value and scheduling the PCell.

Cases 2, 3-1 and 3-2 respectively show exemplary cases when the ACK/NACK is to be transmitted at the SR subframe. Case 2 indicates a case when a predetermined condition is not satisfied, and Cases 3-1/3-2 respectively indicates a case when a predetermined condition is satisfied.

Herein, the predetermined condition includes at least one of cases (1)~(4) described below.

(1) a single PDSCH transmission only on the PCell indicated by detection of a PDCCH having a Downlink Assignment Index (DAI) initial value is present. The initial DAI value may be 0 or 1.

(2) a single PDCCH transmission only on the PCell that has the DAI initial value and indicates a downlink Semi-Persistent Scheduling (SPS) release is present. The initial DAI value may be 0 or 1.

(3) a single PDSCH transmission only on the PCell where there is not a corresponding PDCCH.

When the predetermined condition is not satisfied (i.e., Case 2), the user equipment may perform joint coding on the ACK/NACK information and the SR information (e.g., negative/positive SR indicating 1-bit)(e.g., negative SR: 0, positive SR: 1) and may then transmit the joint-coded information. The joint-coded ACK/NACK+SR may be transmitted by using the E-PUCCH format/resource. The HARQ-ACK PUCCH resource for the E-PUCCH format may be explicitly allocated by using the ARI. For example, the HARQ-ACK PUCCH resource for the E-PUCCH format may be indicated by the value of a TPC (Transmit Power Control) field of at least one or more SCell PDCCH and/or at least one or more Pcell PDCCHs that do not correspond to the initial DAI value.

When the predetermined condition is satisfied, and when the SR corresponds to a negative SR (i.e., Case 3-1), the user equipment may transmit the ACK/NACK by using PUCCH formats 1a/1b and the implicit PUCCH resource of the conventional LTE system. An implicit PUCCH resource may be used for cases (1)(2), and an explicit PUCCH resource may be used for case (3). For example, the ACK/NACK may be transmitted in accordance with the ACK/NACK channel selection method using PUCCH format 1b. Alternatively, when the predetermined condition is satisfied, and when the SR corresponds to a positive SR (i.e., Case 3-2), the user equipment may transmit the ACK/NACK by using the PUCCH resource, which is configured for the SR transmission. In this case, the ACK/NACK may be transmitted by using the PUCCH formats 1b.

Figure 22:
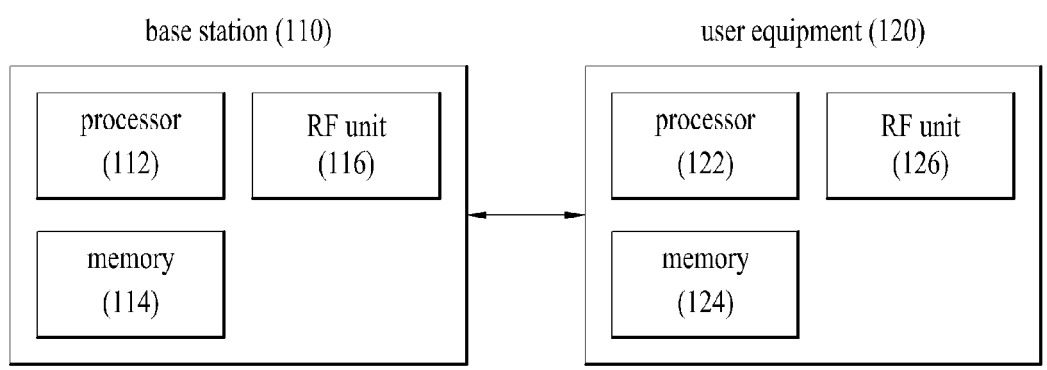
FIG. 22 illustrates an exemplary base station and an exemplary user equipment that can be applied to the embodiment of the present invention.

FIG. 22 illustrates an exemplary base station and an exemplary user equipment that can be applied to the embodiment of the present invention. When a relay is included in a wireless (or radio) communication system, in a Backhaul link, communication is realized between the base station and the relay. And, in an access link, communication is realized between the relay and the user equipment. Therefore, depending upon the respective situation, the terms base station and user equipment may be adequately replaced by the term relay.

Referring to FIG. 22, a wireless communication system includes a base station (BS, 110) and a user equipment (UE, 120). The base station (110) includes a processor (112), a memory (114), and a Radio Frequency (RF) unit (116). The processor (112) may be configured to realize the procedures and/or methods proposed in the present invention. The memory (114) is connected to the processor (112) and stores diverse information related to the operations of the processor (112). The RF unit (116) is connected to the processor (112) and transmits and/or receives radio signals. The user equipment (120) includes a processor (122), a memory (124), and an RF unit (126). The processor (122) may be configured to realize the procedures and/or methods proposed in the present invention. The memory (124) is connected to the processor (122) and stores diverse information related to the operations of the processor (122). The RF unit (126) is connected to the processor (122) and transmits and/or receives radio signals. The base station (110) and/or the user equipment (120) may have a single antenna or multiple antennae.

The embodiments described above correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Claims that do not have any explicit citations within the scope of the claims of the present invention may either be combined to configure another embodiment of the present invention, or new claims may be added during the amendment of the present invention after the filing for the patent application of the present invention.

In this document, the embodiments of the present invention will be described by mainly focusing on the data transmission and reception relation between the base station and the terminal (or user equipment). Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station may be replaced by other terms, such as fixed station, Node B, eNode B (eNB), Access Point (AP), and so on. And, the term User Terminal may be replaced by other terms, such as UE (User Equipment), MS (Mobile Station), MSS (Mobile Subscriber Station), and so on.

The above-described embodiments of the present invention may be implemented by using a variety of methods, e.g., being realized in the form of hardware, firmware, or software, or in a combination of hardware, firmware, and/or software. In case of implementing the embodiments of the present invention in the form of hardware, the method according to the embodiments of the present invention may be implemented by using at least one of ASICs (application specific integrated circuits), DSPs (digital signal processors), DSPDs (digital signal processing devices), PLDs (programmable logic devices), FPGAs (field programmable gate arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

It will be apparent to anyone skilled in the art that the present invention can be realized in another concrete configuration (or formation) without deviating from the scope and spirit of the characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

The present invention may be used in wireless communication devices, such as user equipments, relays, base stations, and so on.

What is claimed is:

1. A method for transmitting uplink control information at a communication apparatus configured with a plurality of cells including a Primary Cell (PCell) and a Secondary Cell (SCell) in a wireless communication system operating in a Time Division Duplex (TDD) mode, the method comprising:

receiving, by the communication apparatus, one or more downlink signals requiring Hybrid Automatic Repeat reQuest Acknowledgement (HARQ-ACK) feedback in a set of subframes; and transmitting, by the communication apparatus, reception response information about the one or more downlink signals through a Physical Uplink Control CHannel (PUCCH) on a subframe configured for Scheduling Request (SR) transmission, wherein when a predetermined condition is not satisfied, the reception response information and SR information are multiplexed and transmitted using a first HARQ-ACK PUCCH resource, wherein when the predetermined condition is satisfied, for a positive SR, the reception response information includes information about an ACK count for the one or more downlink signals and is transmitted using a SR PUCCH resource, and the ACK count is set to 0 when the reception response information about the one or more downlink signals includes Discontinuous Transmission (DTX), and wherein the predetermined condition includes at least one of detecting a single downlink signal corresponding to a Downlink Assignment Index (DAI) initial value only on the PCell in the set of subframes, and detecting a single downlink signal scheduled by a Semi-Persistent Scheduling (SPS) only on the PCell in the set of subframes.

2. The method of claim 1, wherein the DAI initial value is 1.

3. The method of claim 1, wherein 1-bit information indicating a positive/negative SR is added to the reception response information when the predetermined condition is not satisfied.

4. The method of claim 1, wherein the first HARQ-ACK PUCCH resource is assigned by a Radio Resource Control (RRC) signal.

5. The method of claim 1, wherein when the predetermined condition is satisfied, for a negative SR, the reception response information is transmitted using a second HARQ-ACK PUCCH resource.

6. A communication apparatus configured to transmit uplink control information in a situation that a plurality of cells including a PCell and an SCell are configured in a wireless communication system operating in a Time Division Duplex (TDD) mode, the communication apparatus comprising:
- a Radio Frequency (RF) unit; and
- a processor configured to:
  - receive one or more downlink signals requiring Hybrid Automatic Repeat reQuest Acknowledgement (HARQ-ACK) feedback in a set of subframes, and
  - transmit reception response information about the one or more downlink signals through a Physical Uplink Control CHannel (PUCCH) on a subframe configured for Scheduling Request (SR) transmission,
- wherein when a predetermined condition is not satisfied, the reception response information and SR information are multiplexed and transmitted using a first HARQ-ACK PUCCH resource,
- wherein when the predetermined condition is satisfied, for a positive SR, the reception response information includes information about an ACK count for the one or more downlink signals and is transmitted using a SR PUCCH resource, and the ACK count is set to 0 when the reception response information about the one or more downlink signals includes Discontinuous Transmission (DTX), and
- wherein the predetermined condition includes at least one of: detecting a single downlink signal corresponding to a Downlink Assignment Index (DAI) initial value only on the PCell in the set of subframes, and detecting a single downlink signal scheduled by a Semi-Persistent Scheduling (SPS) only on the PCell in the set of subframes.

7. The communication apparatus of claim 6, wherein the DAI initial value is 1.

8. The communication apparatus of claim 6, wherein 1-bit information indicating a positive/negative SR is added to the reception response information when the predetermined condition is not satisfied.

9. The communication apparatus of claim 6, wherein the first HARQ-ACK PUCCH resource is assigned by a Radio Resource Control (RRC) signal.

10. The communication apparatus of claim 6, wherein when the predetermined condition is satisfied, for a negative SR, the reception response information is transmitted using a second HARQ-ACK PUCCH resource.

* * * * *